United States Patent
Nakatsugawa

(10) Patent No.: US 9,439,102 B2
(45) Date of Patent: Sep. 6, 2016

(54) TRANSMITTING APPARATUS, TRANSMISSION METHOD, AND TRANSMISSION SYSTEM

(71) Applicant: FUJITSU LIMITED, Kawasaki-shi, Kanagawa (JP)

(72) Inventor: Keiichi Nakatsugawa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 250 days.

(21) Appl. No.: 13/934,250

(22) Filed: Jul. 3, 2013

(65) Prior Publication Data

US 2013/0286842 A1 Oct. 31, 2013

Related U.S. Application Data

(63) Continuation of application No. PCT/JP2011/050892, filed on Jan. 19, 2011.

(51) Int. Cl.
- *H04W 28/02* (2009.01)
- *H04L 12/803* (2013.01)
- *H04L 12/813* (2013.01)
- *H04L 12/819* (2013.01)

(52) U.S. Cl.
CPC ........ *H04W 28/0268* (2013.01); *H04L 47/125* (2013.01); *H04L 47/20* (2013.01); *H04L 47/215* (2013.01)

(58) Field of Classification Search
CPC  H04W 28/0268; H04W 28/24; H04L 47/20; H04L 47/125; H04L 67/1002; H04L 47/215

USPC ....... 370/229, 230, 231, 232, 235, 310, 315, 370/326, 328, 343, 431, 442, 443, 444

See application file for complete search history.

(56) References Cited

U.S. PATENT DOCUMENTS 7,965,638 B1 * 6/2011 Schzukin et al. .......... 370/235.1
2002/0032794 A1   3/2002 Nishida et al.
(Continued)

FOREIGN PATENT DOCUMENTS

EP    1139612 A2   10/2001
EP    2426984 A1    3/2012
(Continued)

OTHER PUBLICATIONS

JPOA—Office Action of Japanese Patent Application 2012-553503 dated May 13, 2014 with English translation of the relevant part , p. 1, line 1 to line 6 & p. 1, line 10 to p. 2, line 4 of the Office Action.

(Continued)

*Primary Examiner* — Obaidul Huq

(74) *Attorney, Agent, or Firm* — Fujitsu Patent Center

(57) ABSTRACT

A transmitting apparatus transmits a data stream via multiple wireless links and includes a storage unit that stores a guaranteed rate to be guaranteed for the data stream; a dividing unit that divides traffic of the data stream into first traffic corresponding to the guaranteed rate stored in the storage unit and second traffic corresponding to a portion of the traffic exceeding the guaranteed rate; and a distributing unit that distributes the first traffic to at least any one of the wireless links preferentially over the second traffic, and distributes the second traffic to available bandwidths of the plural wireless links.

11 Claims, 21 Drawing Sheets

(56) References Cited

U.S. PATENT DOCUMENTS

| | | | |
|---|---|---|---|
| 2005/0190697 A1 | 9/2005 | Dohi et al. | |
| 2008/0080377 A1 | 4/2008 | Sasaki et al. | |
| 2008/0176577 A1* | 7/2008 | Bourlas et al. | 455/454 |
| 2008/0291927 A1* | 11/2008 | Yong et al. | 370/400 |

FOREIGN PATENT DOCUMENTS

| | | |
|---|---|---|
| JP | 2001-285322 | 10/2001 |
| JP | 2004-080139 | 3/2004 |
| JP | 2005-252333 | 9/2005 |
| JP | 2007-060494 | 3/2007 |
| JP | 2008-085692 | 4/2008 |
| WO | WO-2010-125803 | 11/2010 |

OTHER PUBLICATIONS

International Search Report, mailed in connection with PCT/JP2011/050892 and mailed Apr. 5, 2011.
Metro Ethernet Forum, "Introducing the Specifications of the MEF, An Overview of MEF 6.1 and MEF 10.1", Jun. 2008; pp. 35-36, [online], retrieved on Dec. 24, 2010 from the Internet <URL: http://metroethernetforum.org/PPT_Documents/MEF6-1 and %20MEF10-1 Overview.ppt>.
Metro Ethernet Forum, "MEF Technical Specification MEF10.2, Ethernet Services Attributes Phase 2", Oct. 2009; p. 37, "7.11.1 Standard Bandwidth Profile Parameters and Algorithm", [online], retrieved on Dec. 24, 2010 from the Internet <URL: http://metroethernetforum.org/PDF_Documents/technical-specifications/MEF10.2.pdf>.
LAN MAN Standards Committee of the IEEE Computer Society, IEEE Std 802.3ad-2000, Mar. 30, 2000, "Amendment to Carrier Sense Multiple Access with Collision Detection (CSMA/CD) Access Method and Physical Layer Specifications", [online], retrieved on Dec. 24, 2010 from the Internet <URL: http//voiplab.niu.edu.tw/IEEE/obsolete/802.3/802.3ad-2000.pdf>.
Ishizu et. Al., "Link Aggregation Platform Enabling Flexible Traffic Control in a Cognitive Wireless Networks", IEICE Technical Committee on RCS, Aug. 27, 2010 (with English Abstract).
Hashiguchi et al., "Analysis on Optimal Traffic Distribution Control for Heterogeneous Wireless Link Aggregation Method", IEICE Technical Report, vol. 109, No. 383, SR 2009-74, pp. 1-8, Jan. 2010 (with English Abstract).
English-language translation of International Preliminary Report on Patentability and Written Opinion, mailed Aug. 1, 2013, by WIPO in International Patent Application No. PCT/JP2011/050892 (of which the instant US application is a by-pass continuation).
Lindemann, C., et al., "Adaptive performance management for universal mobile telecommunications system networks", Computer Networks, Mar. 15, 2002, pp. 477-496, vol. 38, No. 4, Elsevier Science Publishers B.V., XP004341657.
EESR—The Extended European Search Report of European Patent Application No. 11856137.2, dated Apr. 14, 2016.

* cited by examiner

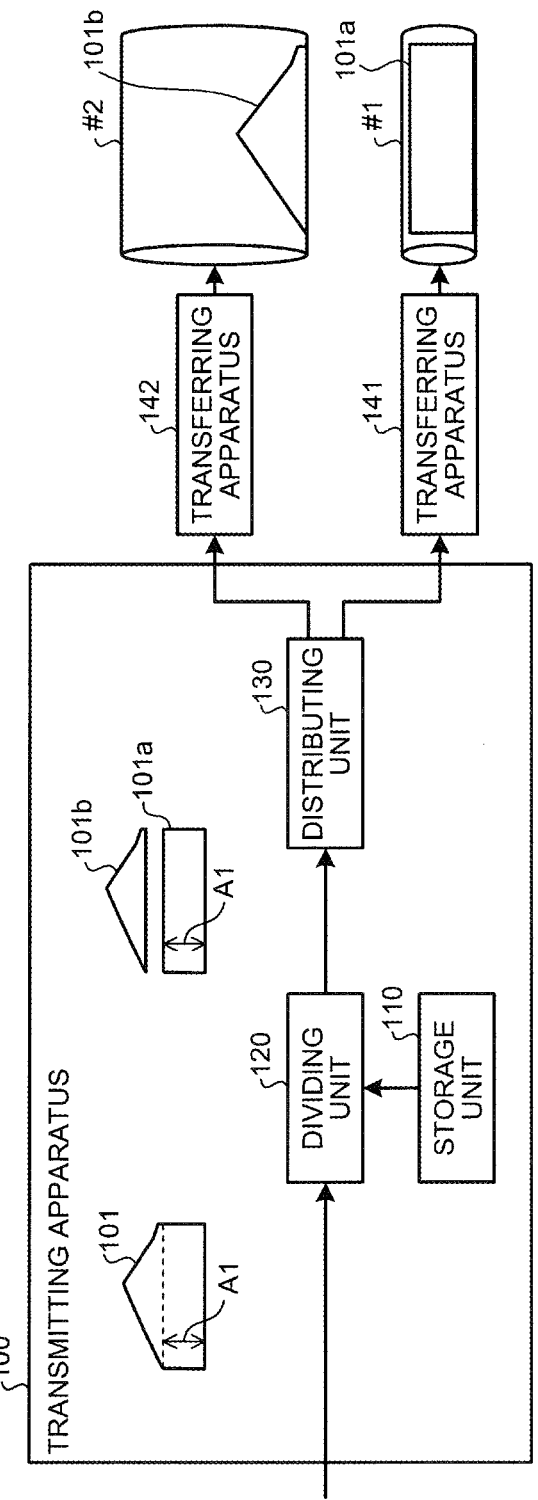

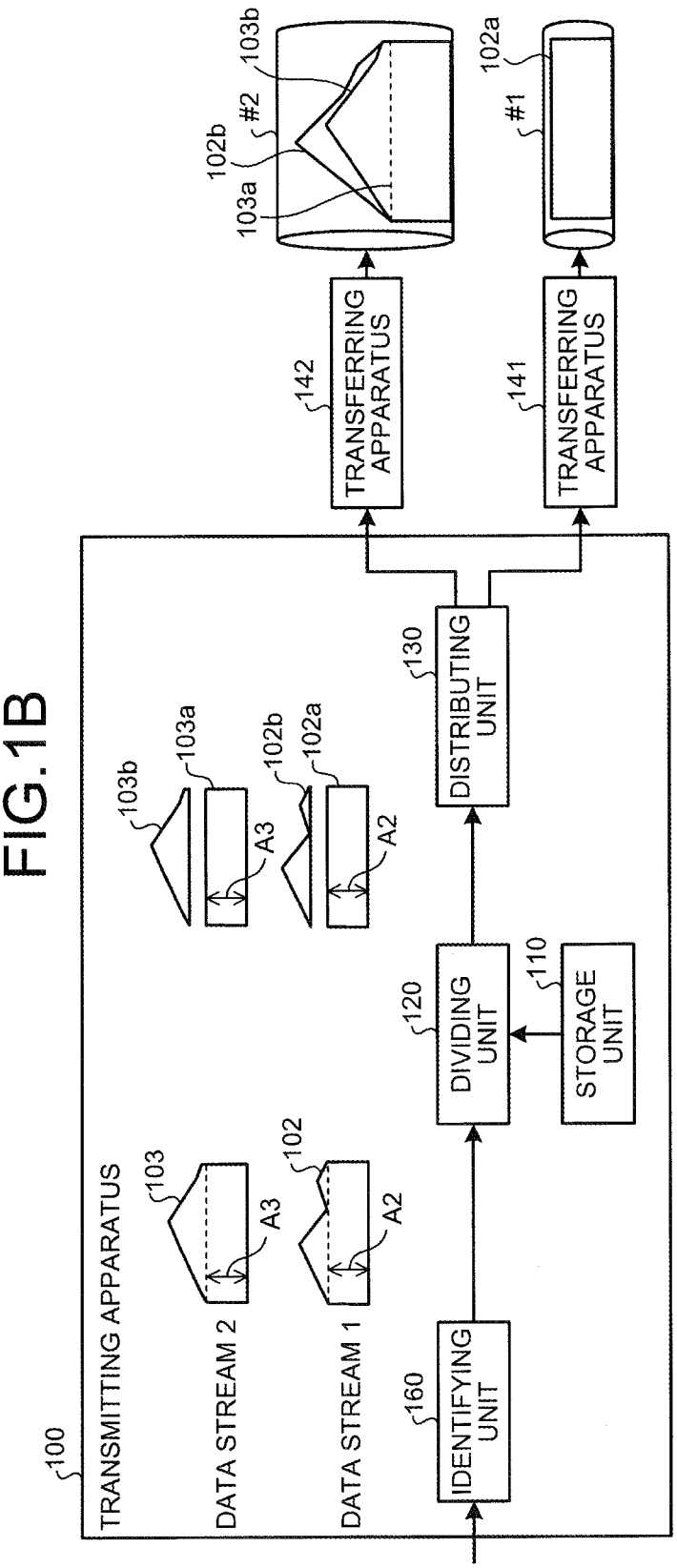

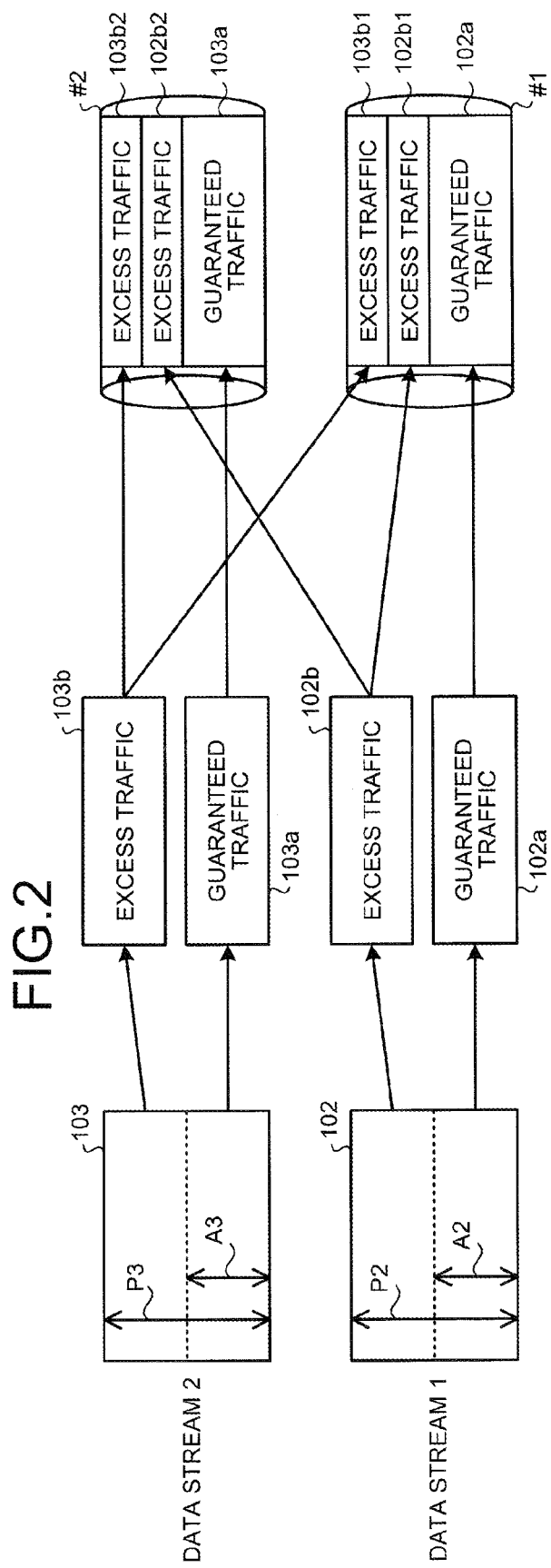

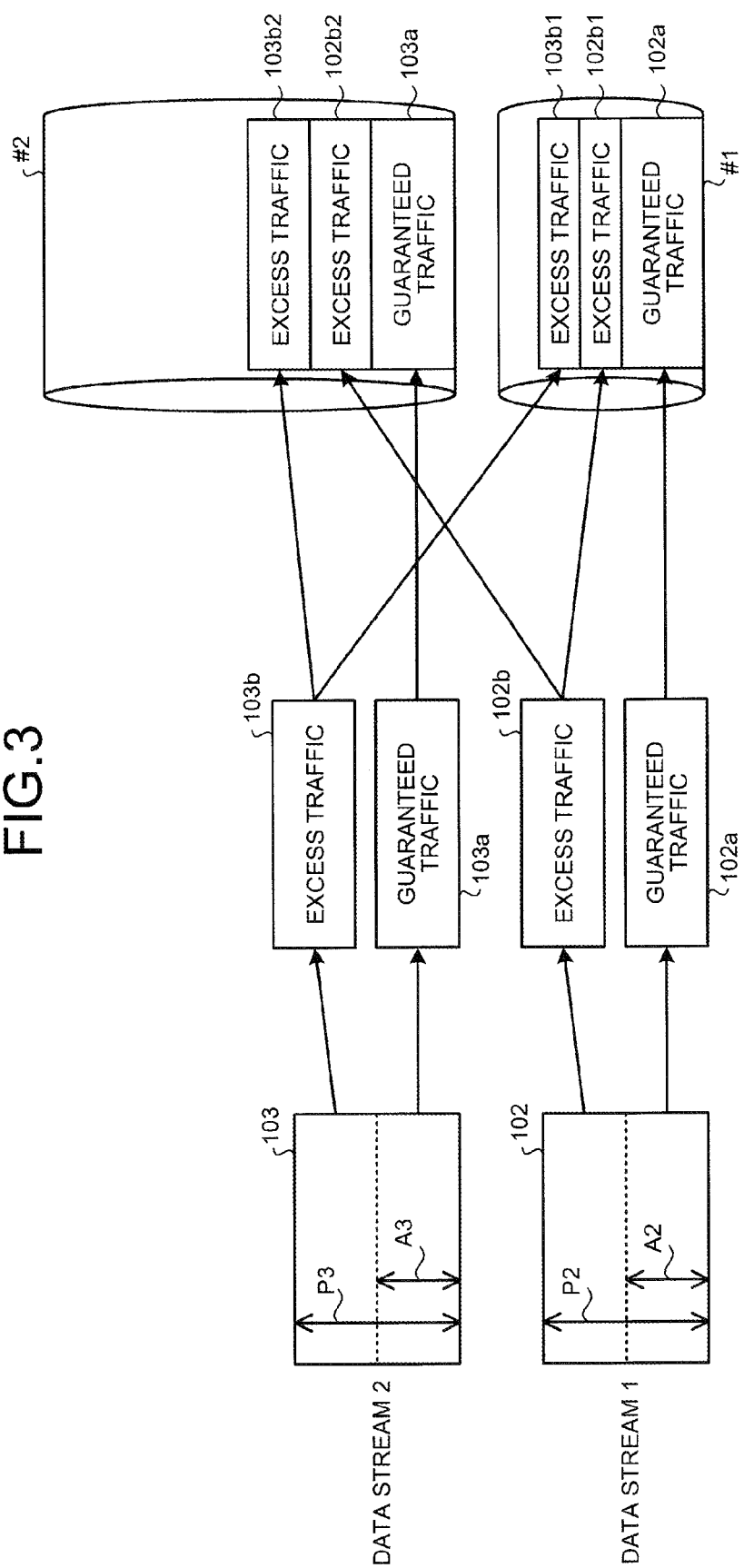

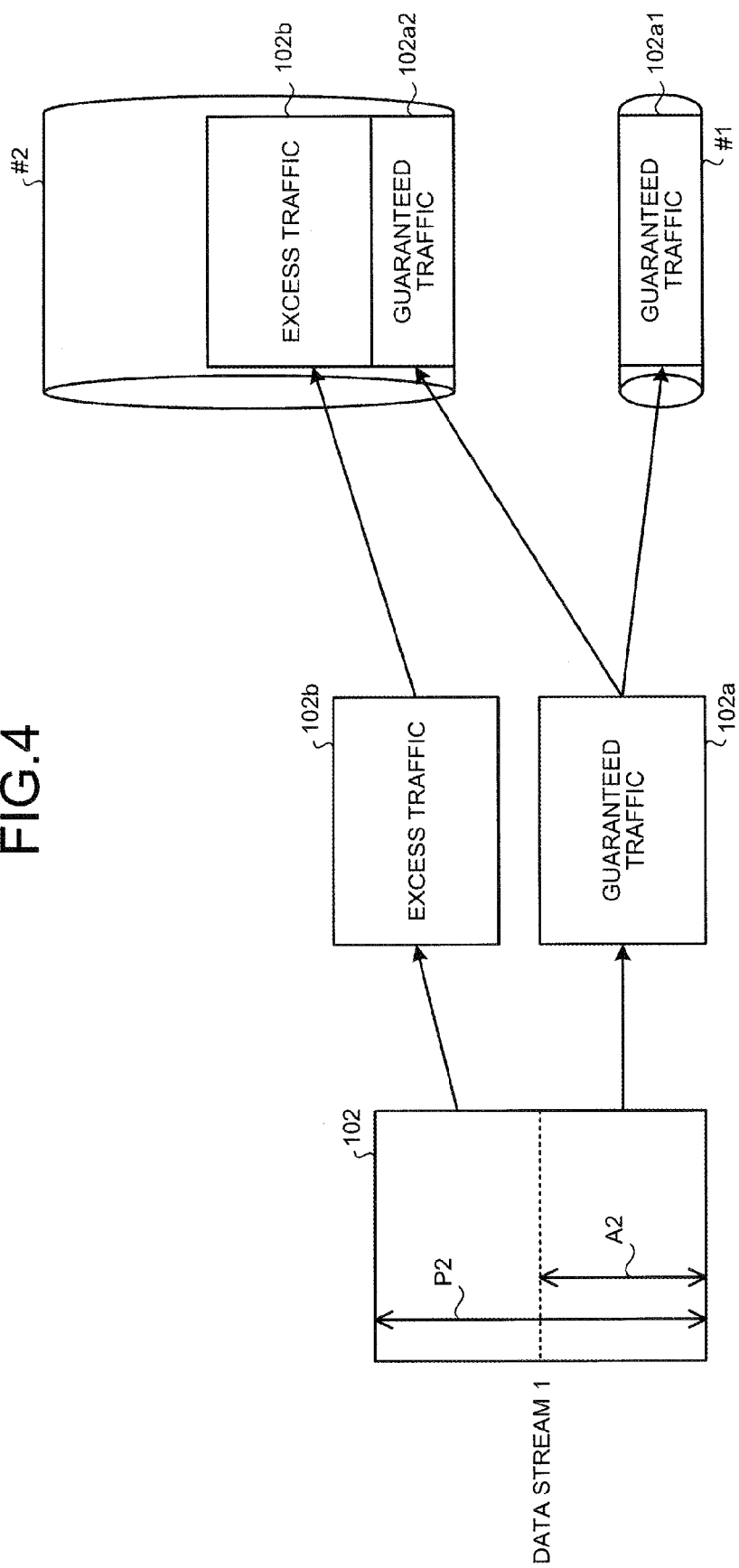

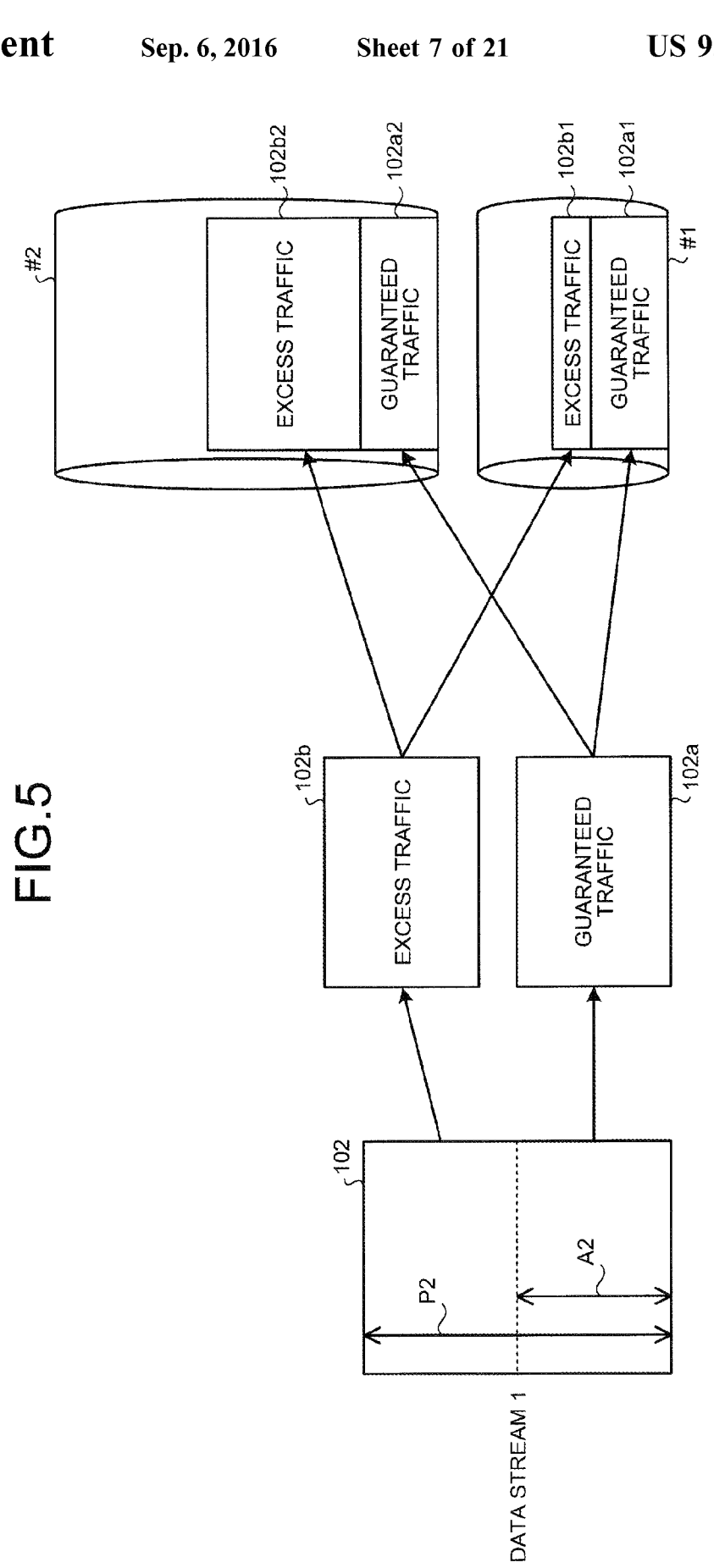

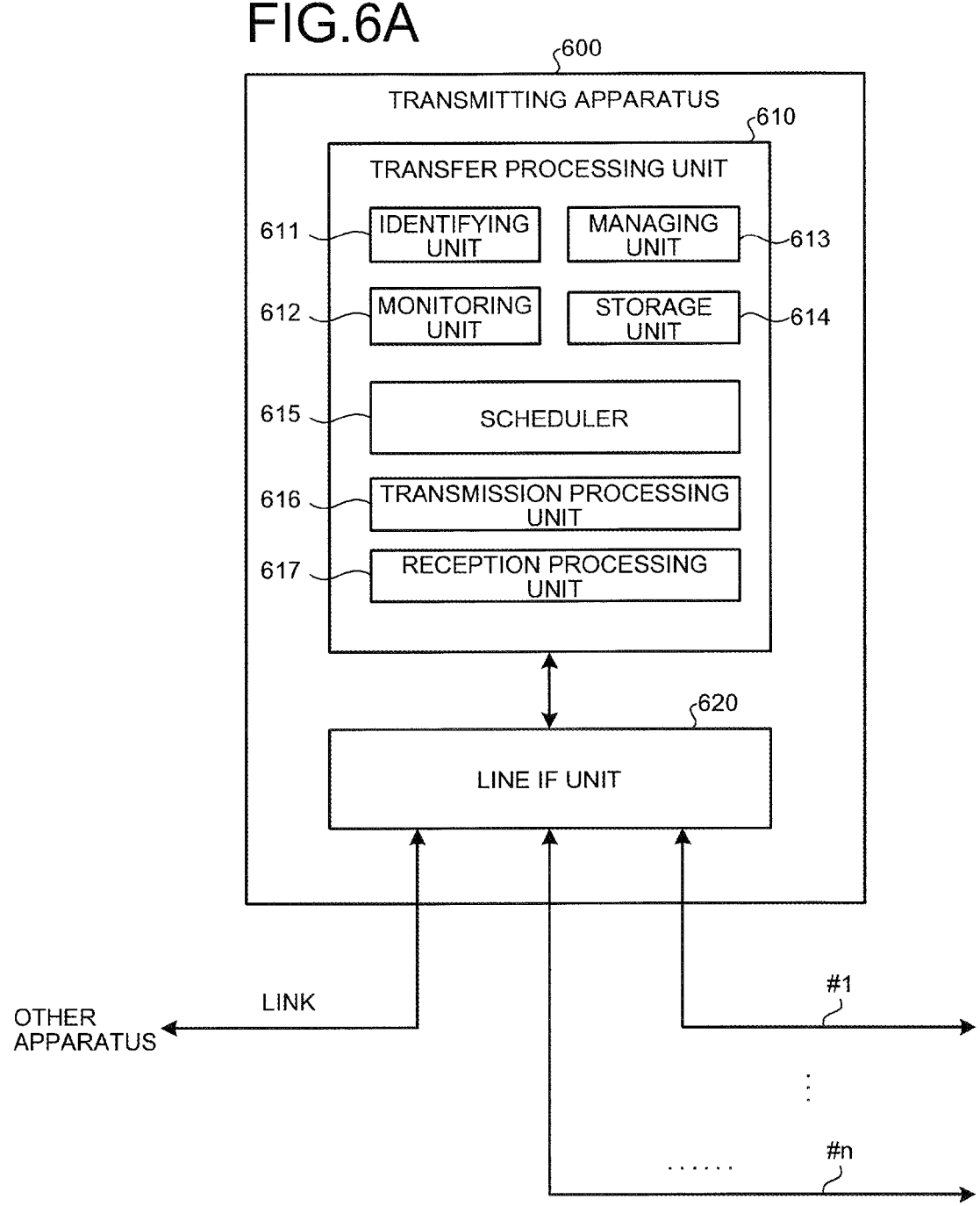

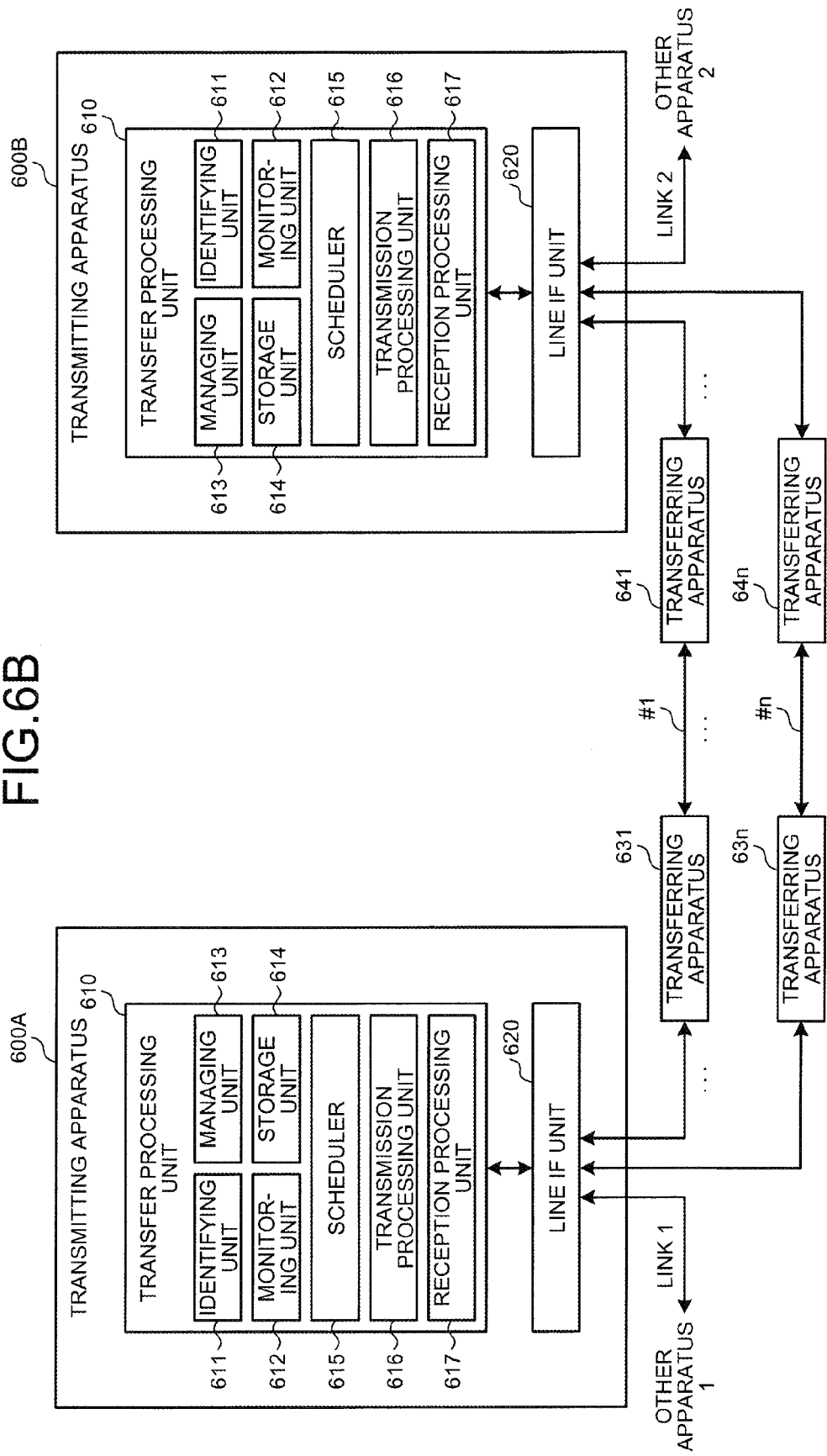

FIG. 7A

| DATA STREAM | IDENTIFICATION INFORMATION | GUARANTEED RATE [Mbps] | GUARANTEED TRAFFIC TRANSFER LINK |
|---|---|---|---|
| DATA STREAM 1 | INPUT PORT 1 | 50 | #1 |
| DATA STREAM 2 | INPUT PORT 2 | 50 | #2 |

FIG. 7B

| DATA STREAM | IDENTIFICATION INFORMATION | GUARANTEED RATE [Mbps] | PEAK RATE [Mbps] | GUARANTEED TRAFFIC TRANSFER LINK |
|---|---|---|---|---|
| DATA STREAM 1 | INPUT PORT 1 | 50 | 100 | #1 |
| DATA STREAM 2 | INPUT PORT 2 | 50 | 100 | #2 |

FIG. 7C

| DATA STREAM | IDENTIFICATION INFORMATION | GUARANTEED RATE [Mbps] | PEAK RATE [Mbps] | GUARANTEED TRAFFIC TRANSFER LINK | DISTRIBUTION GUARANTEED RATE [Mbps] |
|---|---|---|---|---|---|
| DATA STREAM 1 | INPUT PORT 1 | 100 | 200 | #1 | 50 |
|  |  |  |  | #2 | 50 |

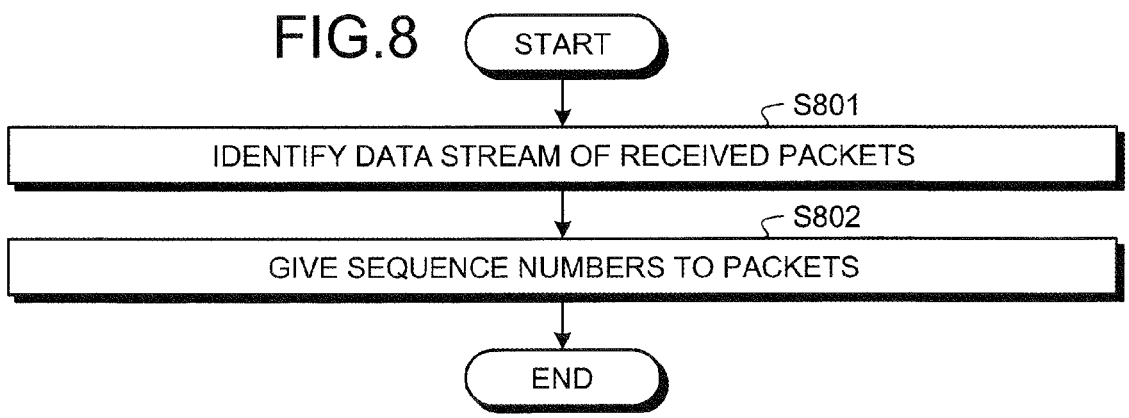

FIG. 8

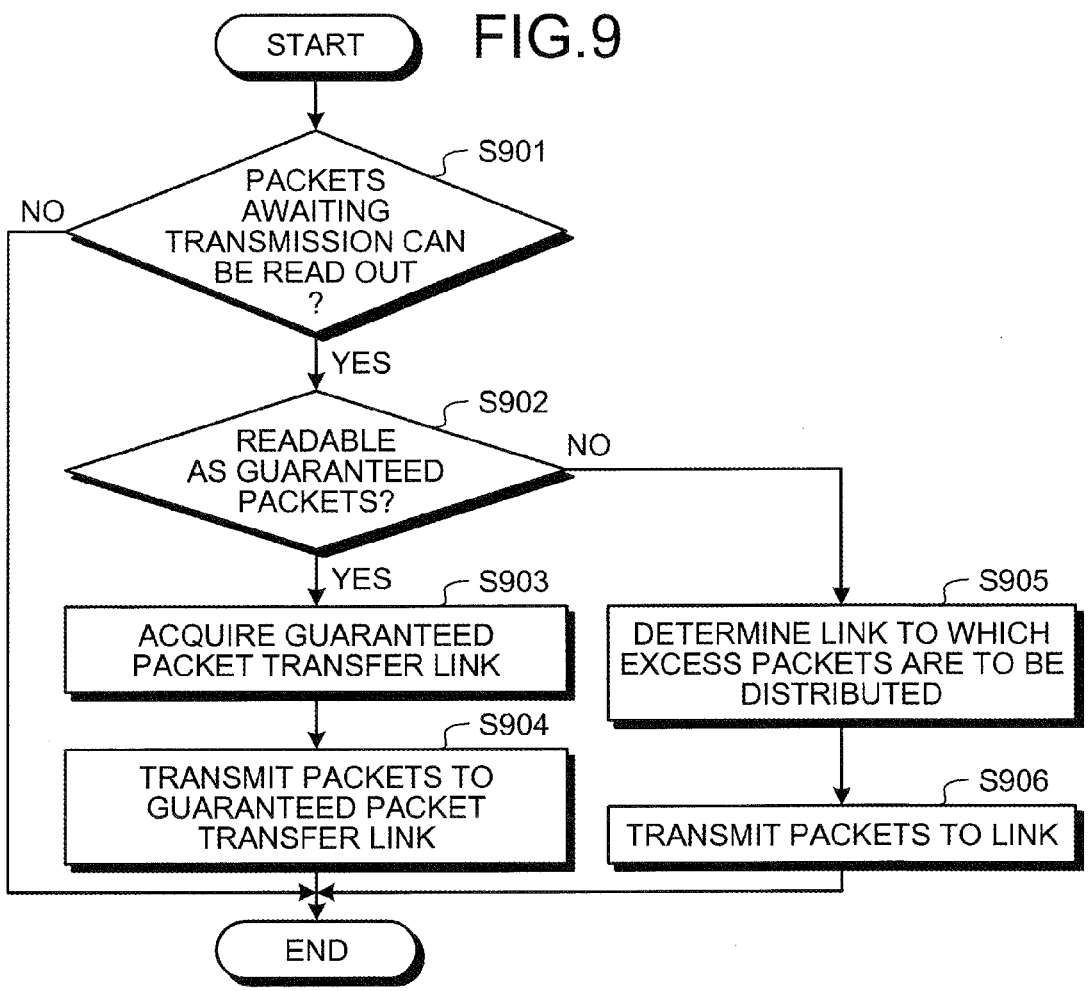

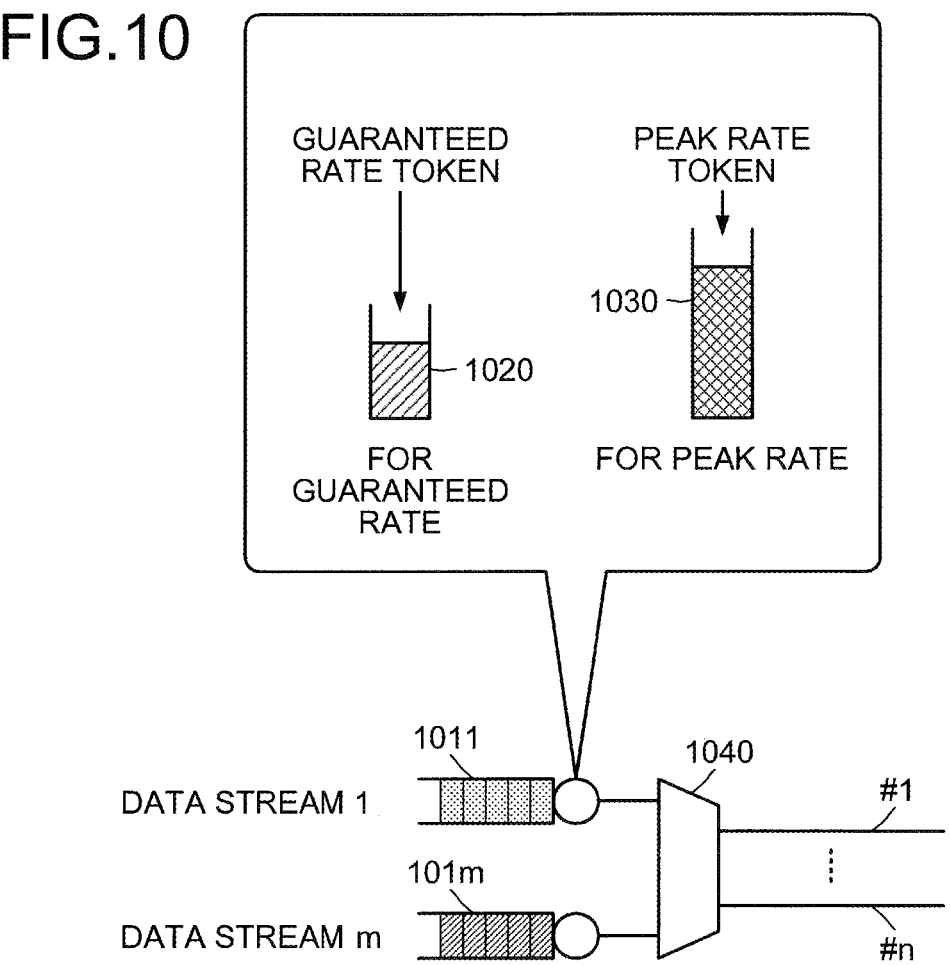

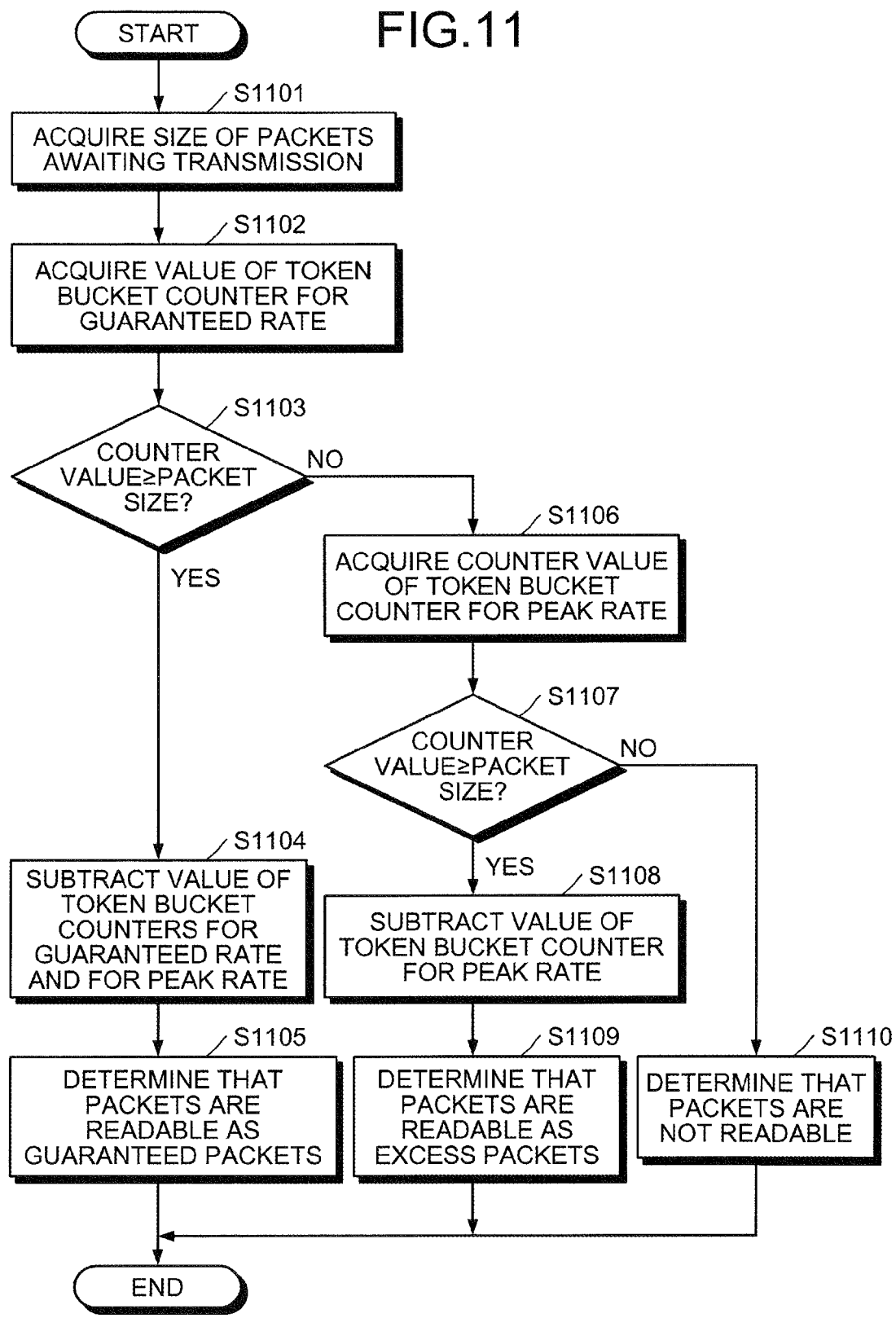

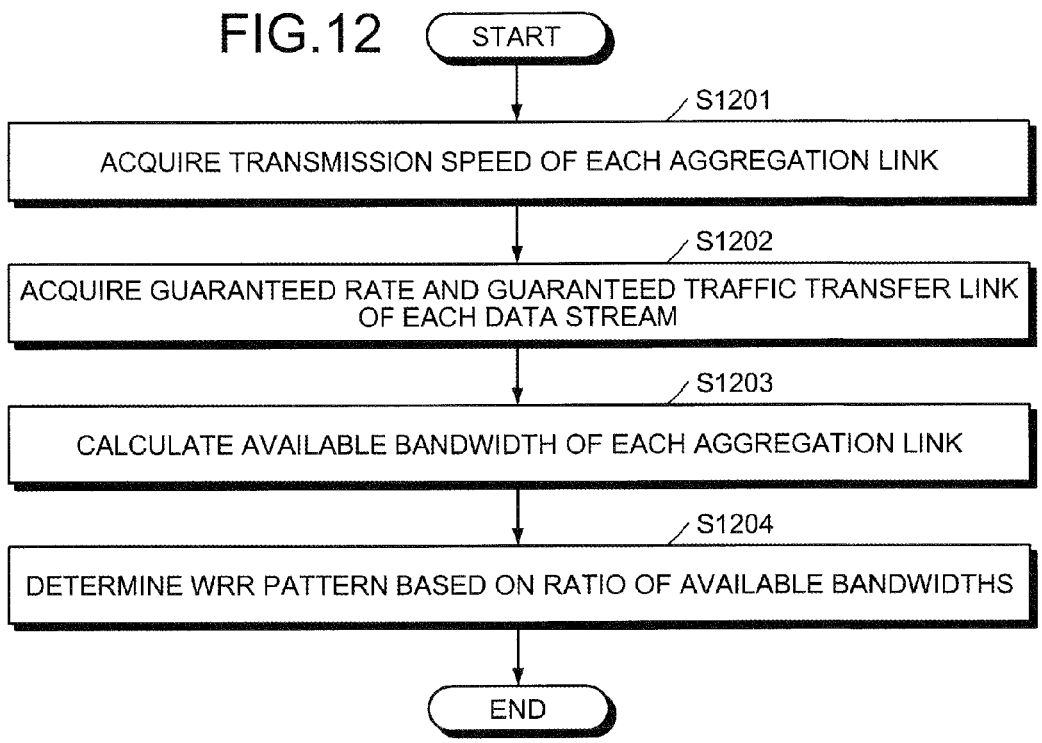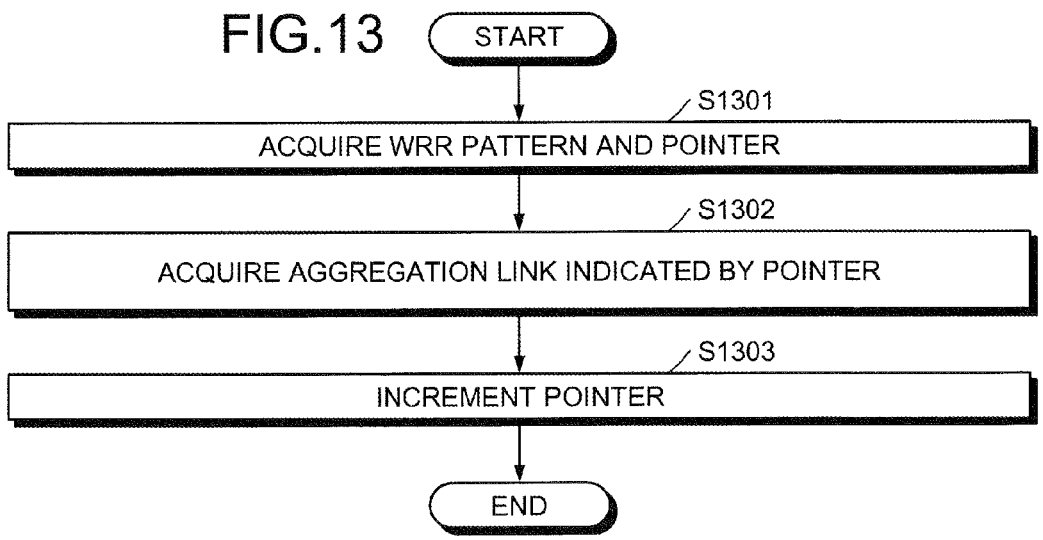

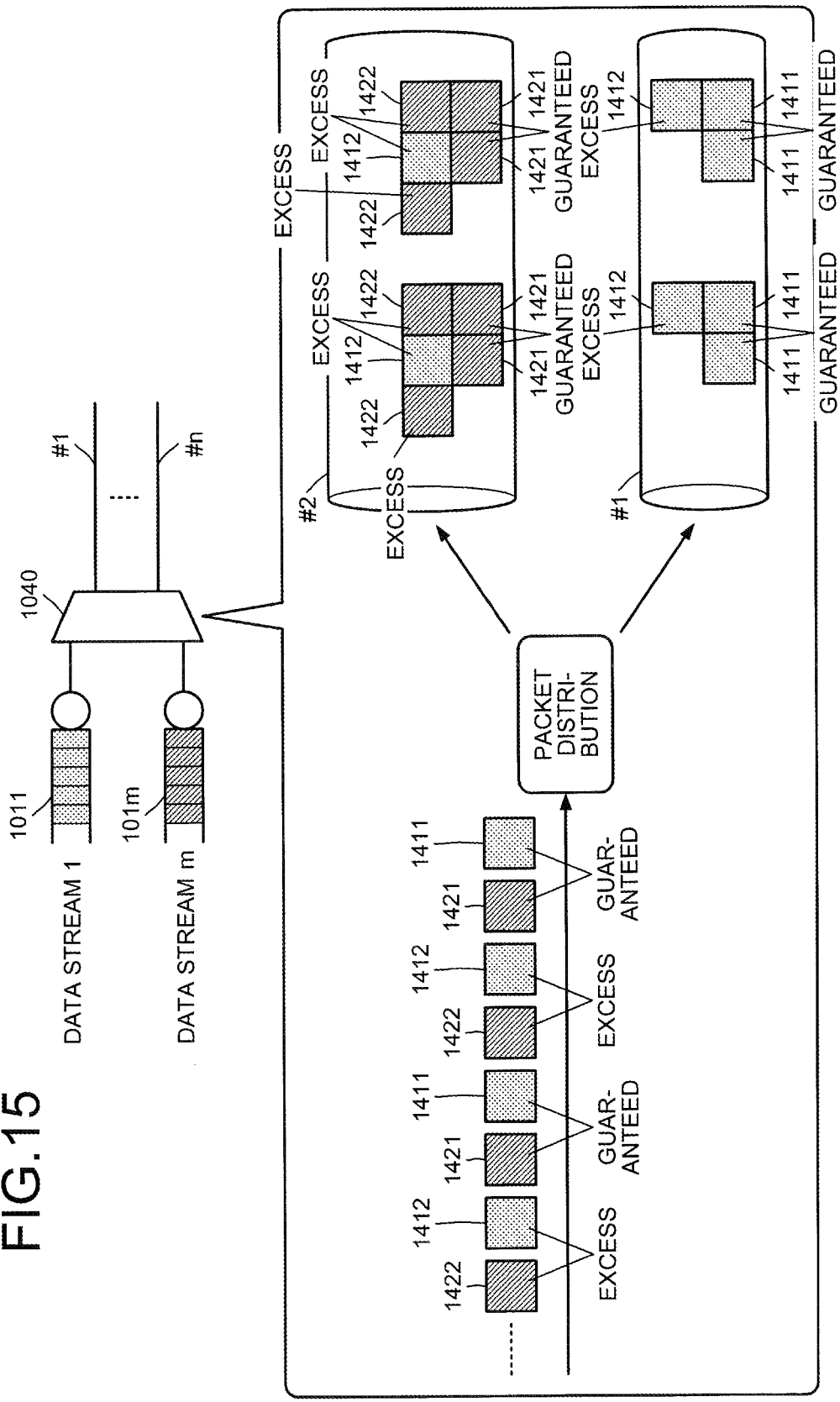

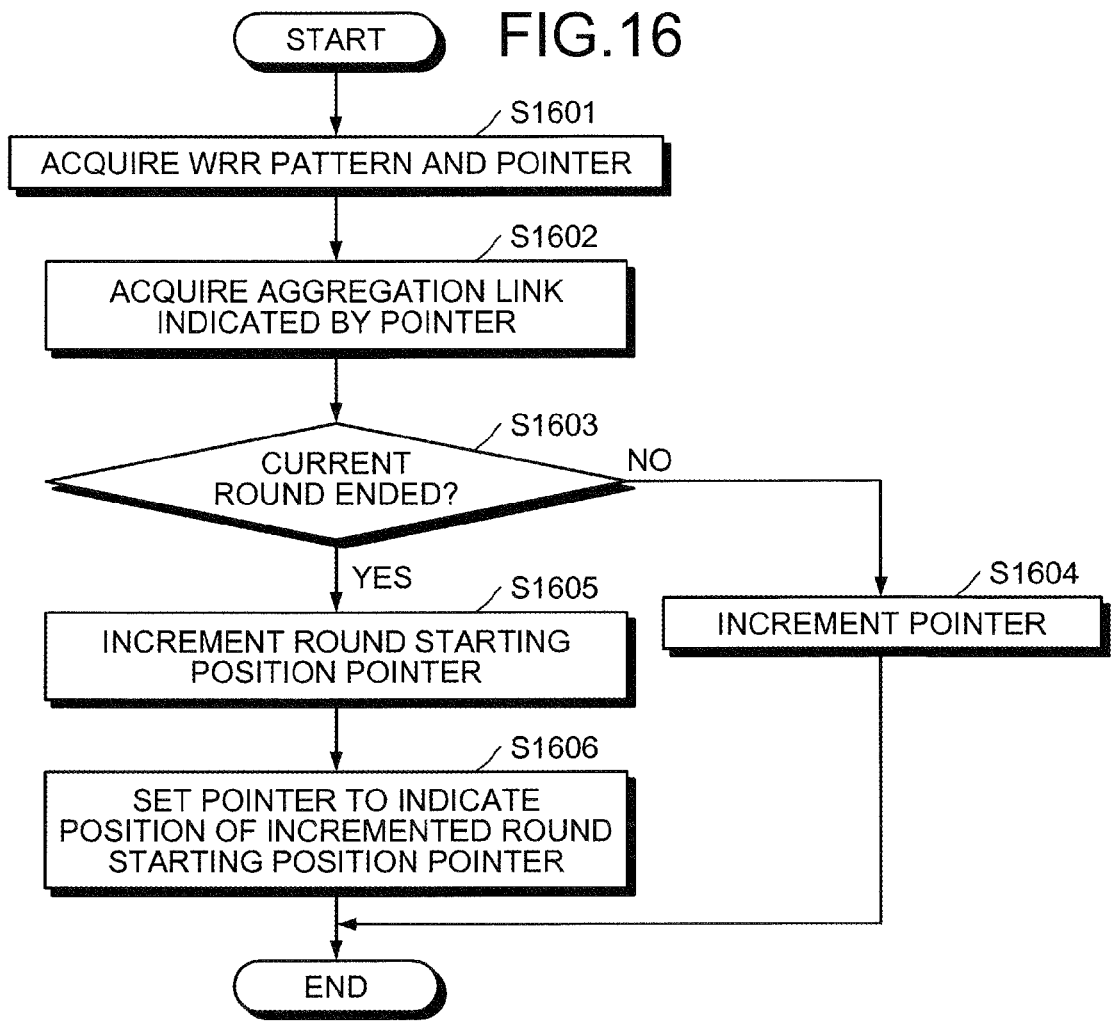

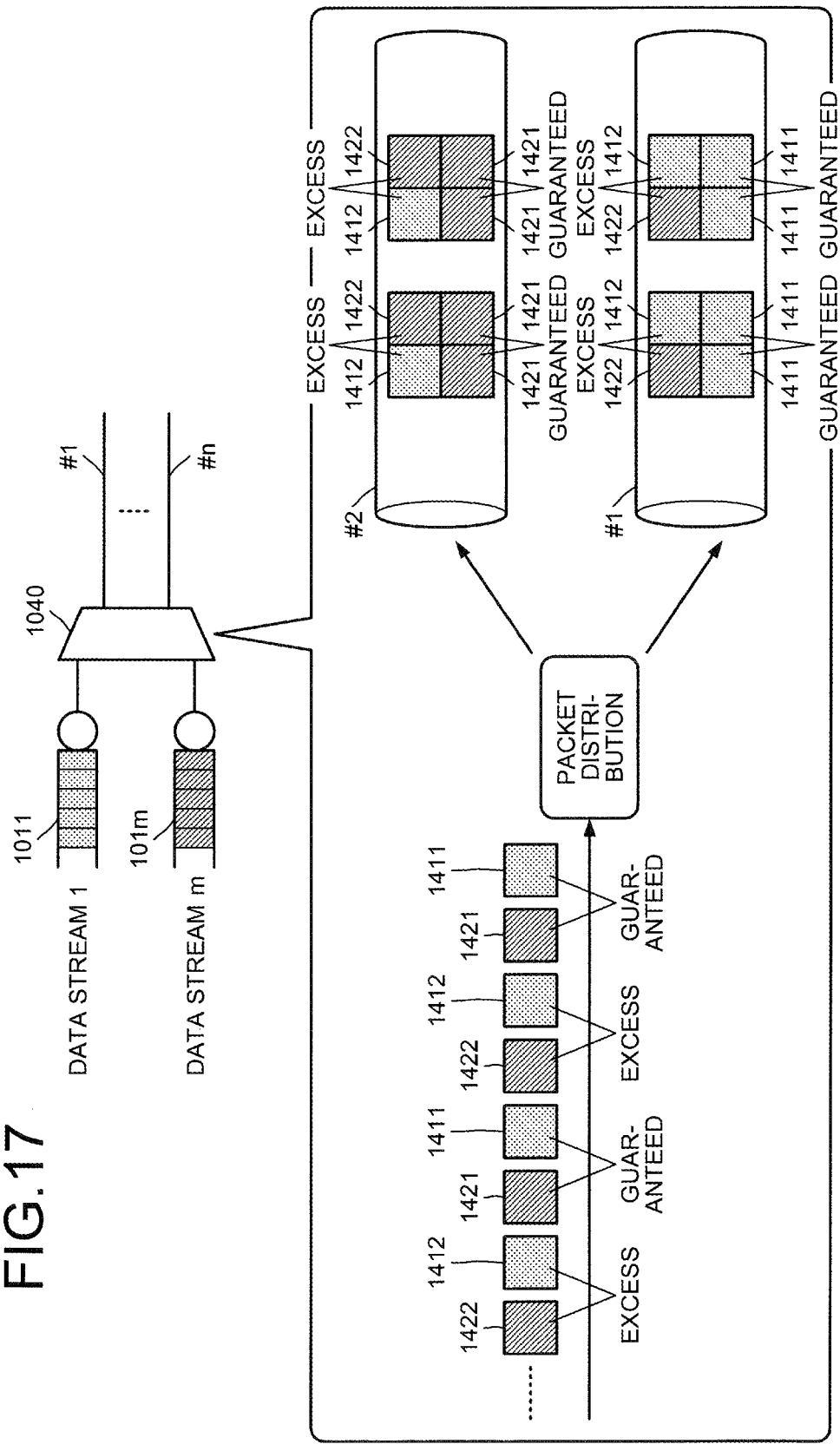

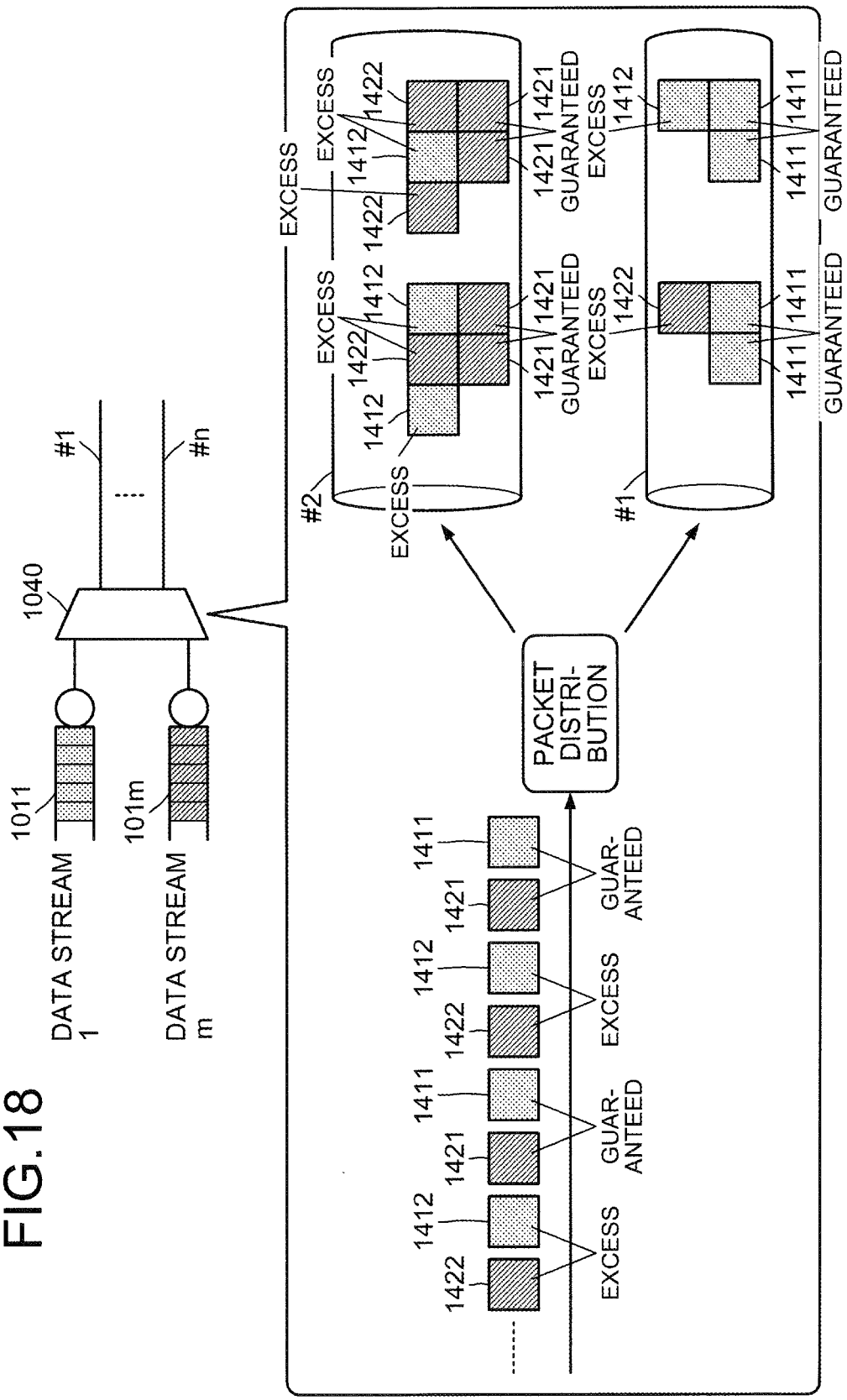

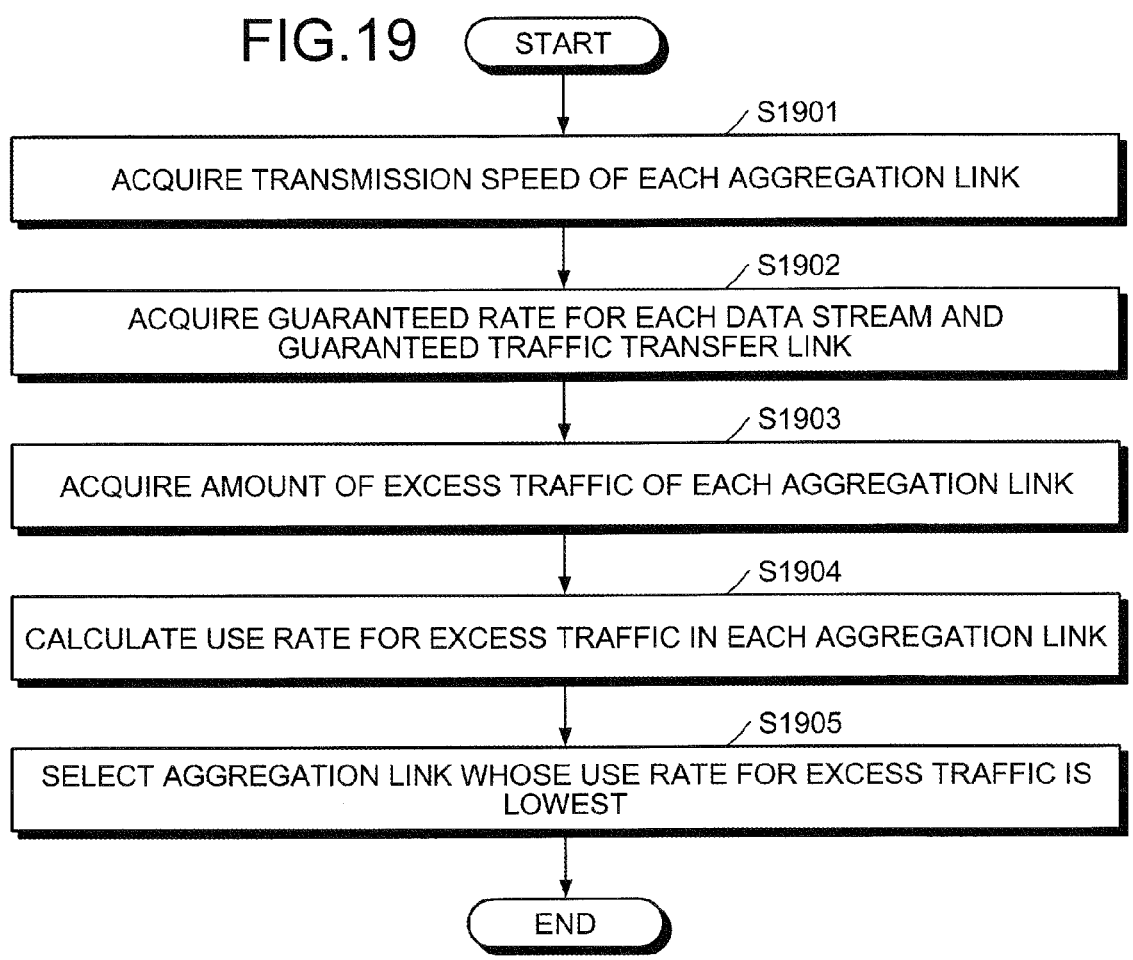

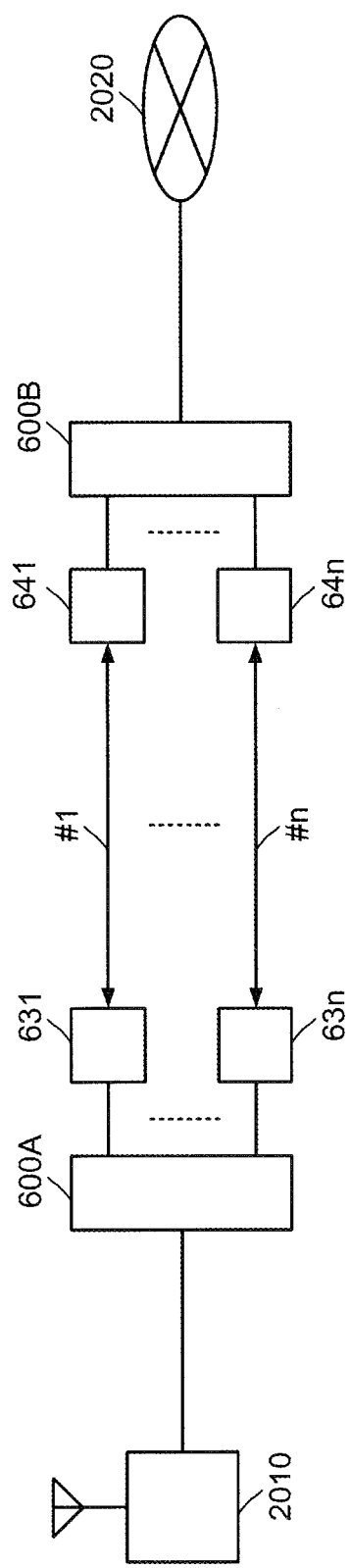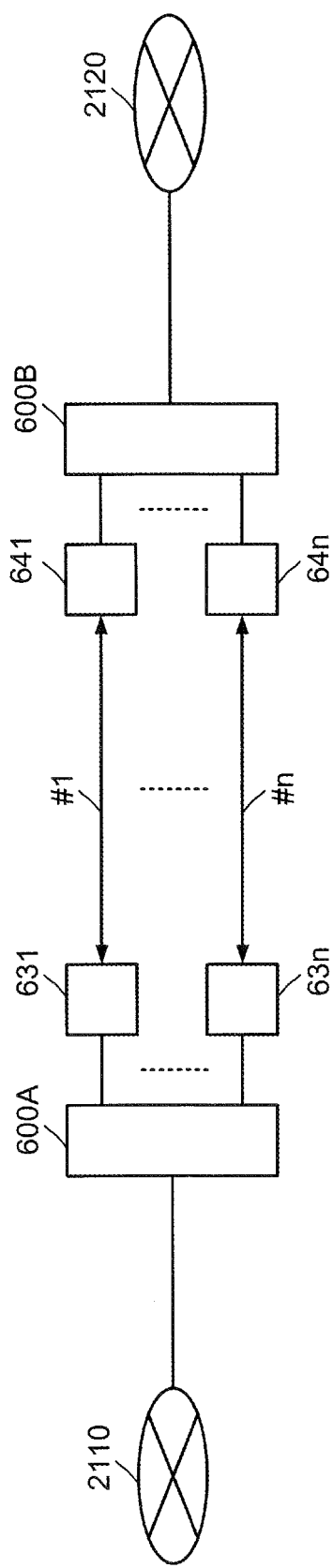

TRANSMITTING APPARATUS, TRANSMISSION METHOD, AND TRANSMISSION SYSTEM

CROSS REFERENCE TO RELATED APPLICATIONS

This application is a continuation application of International Application PCT/JP2011/050892, filed on Jan. 19, 2011 and designating the U.S., the entire contents of which are incorporated herein by reference.

FIELD

The embodiments discussed herein are related to a transmitting apparatus, a transmission method, and a transmission system.

BACKGROUND

For a transmission system, as one network connection service offered to users by a communication common carrier, a guaranteed bandwidth service enables multiple users to use a network of the communication common carrier, at a guaranteed constant communication bandwidth established based on a contractual agreement between the communication common carrier and each user. The guaranteed bandwidth service is used when, for example, communication is of high importance and requires high reliability. The guaranteed bandwidth service is used for, for example, virtual private network (VPN) connections of a corporate user and backhaul connection between a wireless base station and a core network of a mobile communication common carrier.

The guaranteed bandwidth service has been disclosed as an example by the Metro Ethernet Forum that promotes the use of Ethernet (a registered trademark) technology in metropolitan area networks (MAN), by providing wide-area Ethernet services, creating technical specifications, etc., (see, for example, Metro Ethernet Forum, "Introducing the Specifications of the MEF, An Overview of MEF 6.1 and MEF 10.1", pp. 35-36, [online], [retrieved on Dec. 24, 2010], from the Internet; and Metro Ethernet Forum, "MEF Technical Specification MEF10.2, Ethernet Services Attributes Phase 2", p. 37, "7.11.1 Standard Bandwidth Profile Parameters and Algorithm", [online], [retrieved on Dec. 24, 2010], from the Internet).

For example, according to the technical specification prescribed by the Metro Ethernet Forum, bandwidth parameters used when an Ethernet virtual connection service is provided in a wide-area Ethernet network, are defined that include a committed information rate (CIR) meaning a guaranteed bandwidth and an excess information rate (EIR) meaning an upper limit bandwidth available for transmission when unused bandwidth is present though no bandwidth is guaranteed. "Ethernet" is a registered trademark.

Not only wired links via metal cables and optical fiber cables but also wireless links using microwaves are used as connection links in the network of a communication common carrier that provides a guaranteed bandwidth service. For wireless links, control may be executed according to wireless channel quality, where a high speed modulation scheme (for example, 64 QAM, 128 QAM, or 256 QAM) is used for quality that is high, and a low speed modulation scheme that is highly error resistant (for example, BPSK or QPSK) is used for quality that is low. Such control is referred to as, for example, "adaptive modulation". Further for wireless links, transmission speed also varies consequent to adaptive modulation.

For a guaranteed bandwidth service, it is considered that the user enters a contractual agreement stipulating a guaranteed rate as an item of the service level agreement (SLA) to be satisfied. On the other hand, a peak rate is not subject to the SLA and therefore, in a case where traffic of the guaranteed rate can be transferred, no violation of the service agreement can be established even if traffic of a volume up to the peak rate is not transferred. On the other hand, it is more comfortable for the user to be able to communicate at a higher throughput and therefore, it is desirable that traffic of a volume up to the peak rate can be transferred.

Link aggregation is known that is formed by aggregating multiple communication links and that is used as a high capacity link, to realize higher data transfer (see, for example, Japanese Laid-Open Patent Publication Nos. 2007-060494, 2005-252333, and 2004-080139; and IEEE Std 802.3ad-2000, 2000/03/30, "Amendment to Carrier Sense Multiple Access with Collision Detection (CSMA/CD) Access Method and Physical Layer Specifications", [online], [retrieved on Dec. 24, 2010], from the Internet; Ishizu, Murakami, and Harada, "Link Aggregation Platform Enabling Flexible Traffic Control in a Cognitive Wireless Networks", IEICE Technical Committee on RCS, Aug. 27, 2010; and Higuchi, et al., "Analysis of Optimal Traffic Distribution Control in a Heterogeneous Wireless Link Aggregation Method", IEICE Technical Report, Vol. 109, No. 383, SR 2009-74, pp. 1-8, Jan. 2010). An example of the link aggregation is IEEE 802.3ad as a technical standard employed when link aggregation is formed and used for wired Ethernet links.

According to IEEE 802.3ad, the transmission speeds of all the Ethernet links are equal as a precondition, and no sequence number is given to any data packet and the sequence guarantee of the packets is realized using the data stream (conversation). Therefore, even though multiple Ethernet links are aggregated, the data packets are transmitted using any one of the Ethernet links for each data stream.

However, according to the conventional techniques, a problem arises in that traffic throughput can not be enhanced. For example, the transmission speed of each of the wireless links executing the aggregation varies consequent to, for example, frequency-selective fading and adaptive modulation. In a case where the transmission speed of a wireless link to which data is distributed is lower than a speed commensurate with the amount of data and even if bandwidth in another wireless link is available, a portion of the data is discarded or delayed and therefore, the throughput drops.

SUMMARY

According to an aspect of an embodiment, a transmitting apparatus transmits a data stream via multiple wireless links and includes a storage unit that stores a guaranteed rate to be guaranteed for the data stream; a dividing unit that divides traffic of the data stream into first traffic corresponding to the guaranteed rate stored in the storage unit and second traffic corresponding to a portion of the traffic exceeding the guaranteed rate; and a distributing unit that distributes the first traffic to at least any one of the wireless links preferentially over the second traffic, and distributes the second traffic to available bandwidths of the plural wireless links.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of a first example of a configuration of a transmitting apparatus according to an embodiment;

FIG. 1B is a diagram of a second example of the configuration of the transmitting apparatus according to the embodiment;

FIG. 2 is a diagram of a first example of distribution of traffic;

FIG. 3 is a diagram of a second example of distribution of traffic;

FIG. 4 is a diagram of a third example of distribution of traffic;

FIG. 5 is a diagram of a fourth example of distribution of traffic;

FIG. 6A is a diagram of a specific example of the transmitting apparatus;

FIG. 6B is a diagram of an example of transmitting apparatuses that mutually are counterpart apparatuses of one another;

FIG. 7A is a diagram of a first example of information stored in a storage unit;

FIG. 7B is a diagram of a second example of the information stored in the storage unit;

FIG. 7C is a diagram of a third example of the information stored in the storage unit;

FIG. 8 is a flowchart of a process of receiving packets executed by the transmitting apparatus;

FIG. 9 is a flowchart of a process of packet transmission executed by the transmitting apparatus;

FIG. 10 is a diagram of an example of a reading determination process executed by the transmitting apparatus;

FIG. 11 is a flowchart of an example of the reading determination process executed by the transmitting apparatus;

FIG. 12 is a flowchart (Part I) of a first example of an excess packet distribution process;

FIG. 13 is a flowchart (Part II) of the first example of the excess packet distribution process;

FIG. 15 is a diagram of a second example of distribution by the determination process depicted in FIGS. 12 and 13;

FIG. 16 is a flowchart of a second example of the excess packet distribution process;

FIG. 17 is a diagram of a first example of the distribution by the determination process depicted in FIG. 16;

FIG. 18 is a diagram of a second example of the distribution by the determination process depicted in FIG. 16;

FIG. 19 is a flowchart of a third example of the excess packet distribution process;

FIG. 20 is a diagram of a first example of a transmission system to which the transmitting apparatus is applied; and FIG. 21 is a diagram of a second example of the transmission system to which the transmission apparatus is applied.

DESCRIPTION OF EMBODIMENTS

Figure 1C:
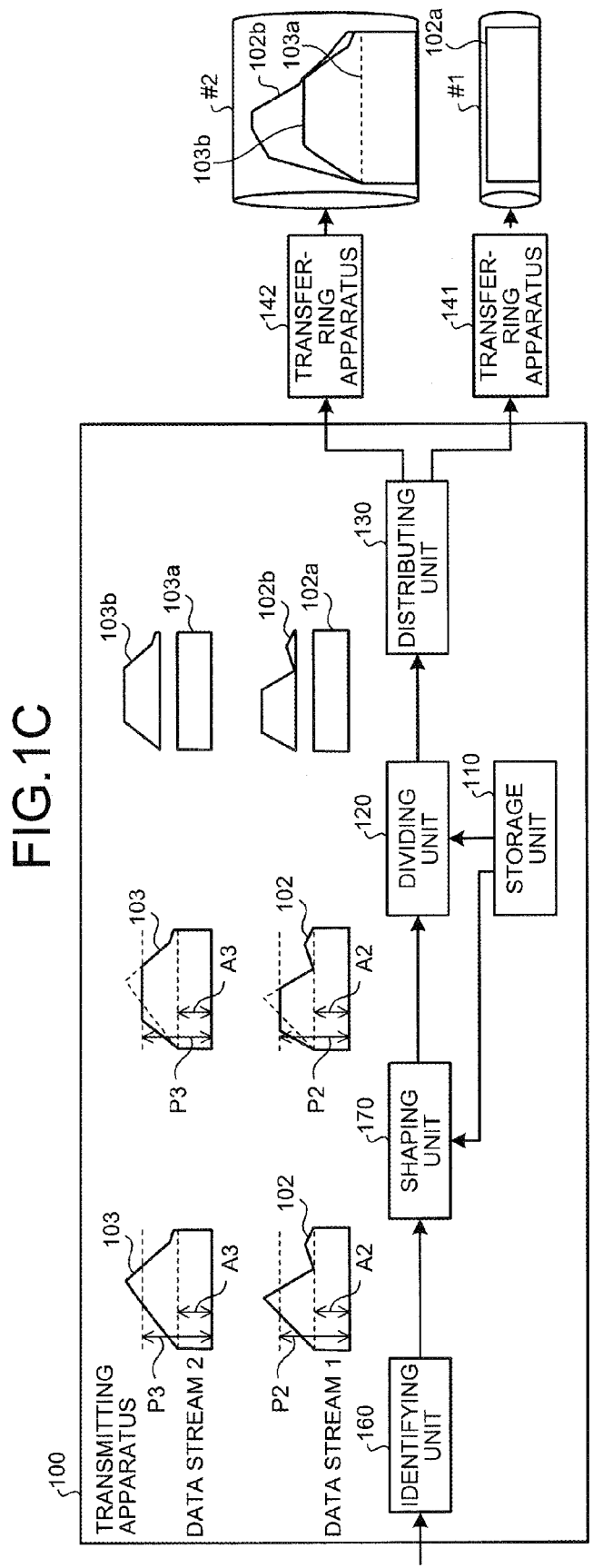
FIG. 1C is a diagram of a third example of the configuration of the transmitting apparatus according to the embodiment.

Preferred embodiments will be described in detail with reference to the accompanying drawings.

FIG. 1A is a diagram of a first example of a configuration of a transmitting apparatus according to an embodiment. As depicted in FIG. 1A, a transmitting apparatus 100 according to the embodiment includes a storage unit 110, a dividing unit 120, and a distributing unit 130. The transmitting apparatus 100 transmits a data stream to a counterpart apparatus using link aggregation that uses plural wireless links. In the embodiment, the transmitting apparatus 100 transmits the data stream by a link aggregation that uses aggregation links #1 and #2. The aggregation links #1 and #2 are each a wireless link.

The data stream is a group of packets identified based on, for example, an input link (input port), the MAC address of the addressee or the transmission source, the IP address of the addressee or the transmission source, the port number of the addressee or the transmission source, or the type of the higher layer.

Transferring apparatuses 141 and 142 are transferring apparatuses that respectively transfer segments of traffic distributed thereto by the transmitting apparatus 100 via the aggregation links #1 and #2; that respectively acquire the states of the aggregation links #1 and #2, and that manage the aggregation links #1 and #2. The states of the aggregation links #1 and #2 are the transmission speeds thereof, which vary consequent to, for example, the wireless states of the aggregation links #1 and #2.

Each of the transferring apparatuses 141 and 142 acquires parameters such as the guaranteed rate and the peak rate of each data stream; identifies to which data stream 1 or 2, packets input from the transmitting apparatus 100 belong; monitors the amount of transferred traffic based on data packet size and a time period elapsing since the previous transmission session; and when the input traffic of each of the data streams 1 and 2 exceeds the peak rate, transmits the traffic while executing traffic shaping.

A case will be described where the transmitting apparatus 100 transmits one data stream by the link aggregation. Traffic 101 is traffic of the data stream transmitted by the transmitting apparatus 100. With respect to depiction the traffic 101, the horizontal direction represents time and the vertical direction represents the traffic amount (rate). A guaranteed rate A1 represents the rate to be guaranteed for the data stream transmitted by the transmitting apparatus 100. In this example, the traffic 101 is of an amount that exceeds the guaranteed rate A1.

The storage unit 110 stores therein the guaranteed rate A1 of the data stream transmitted by the transmitting apparatus 100. The dividing unit 120 and the distributing unit 130 execute output scheduling of the traffic of the data stream based on the traffic amount of the data stream transmitted by the transmitting apparatus 100 and the transmission speeds of the aggregation links #1 and #2. Information concerning the transmission speed of each of the aggregation links #1 and #2 can be acquired by a notification sent from each of the transferring apparatuses 141 and 142 or by an inquiry sent from the transmitting apparatus 100 to each of the transferring apparatuses 141 and 142.

The dividing unit 120 acquires the guaranteed rate A1 stored in the storage unit 110; divides the traffic 101 into guaranteed traffic 101a (first traffic) of an amount equivalent to the guaranteed rate A1 and excess traffic 101b (second traffic) of an amount equivalent to the amount by which the guaranteed rate A1 is exceeded; and outputs the resulting guaranteed traffic 101a and the resulting excess traffic 101b to the distributing unit 130.

The distributing unit 130 distributes the guaranteed traffic 101a output from the dividing unit 120 to at least any one of the aggregation links #1 and #2; and preferentially distributes the guaranteed traffic 101a over the excess traffic 101b.

The distributing unit 130 distributes the excess traffic 101b output from the dividing unit 120, to available bandwidths of the aggregation links #1 and #2. In this manner, the distributing unit 130 distinguishes the excess traffic 101b from the guaranteed traffic 101a and distributes the excess traffic 101b to available bandwidths of the aggregation links #1 and #2. Consequently, the excess traffic 101b can be transmitted by utilizing the available bandwidths of the aggregation links #1 and #2 and the throughput can be improved.

For example, it is assumed that the distributing unit 130 distributes the guaranteed traffic 101a to the aggregation link #1. In this case, in the aggregation link #1, if no bandwidth is available for the excess traffic 101b, the distributing unit 130 distributes the excess traffic 101b to the aggregation link #2. As a result, any delay and/or discarding of the excess traffic 101b can be prevented and the throughput can be improved.

The distributing unit 130 outputs the traffic distributed to the aggregation link #1, to the transferring apparatus 141 and further outputs the traffic distributed to the aggregation link #2, to the transferring apparatus 142. Thus, of the data stream, the traffic distributed to the aggregation link #1 is transmitted by the aggregation link #1; and the traffic distributed to the aggregation link #2 is transmitted by the aggregation link #2.

FIG. 1B is a diagram of a second example of the configuration of the transmitting apparatus according to the embodiment. In FIG. 1B, portions identical to those depicted in FIG. 1A are given the same reference numerals used in FIG. 1A and will not again be described. The transmitting apparatus 100 may transmit plural data streams using the aggregation links #1 and #2. In this case, as depicted in FIG. 1B, the transmitting apparatus 100 may include an identifying unit 160 in addition to the configuration depicted in FIG. 1A. It is assumed in this case that the transmitting apparatus 100 transmits data streams 1 and 2.

The identifying unit 160 receives input of the data streams to be transmitted by the transmitting apparatus 100; identifies which one of the data streams 1 or 2, the input data stream is. Traffic of the data streams 1 and 2 will be denoted by "traffic 102" and "traffic 103", respectively. Guaranteed rates A2 and A3 are guaranteed rates of the data streams 1 and 2, respectively.

For each of the data streams 1 and 2, the dividing unit 120 and the distributing unit 130 execute the output scheduling of the traffic while monitoring the traffic amount of the data streams 1 and 2.

The dividing unit 120 divides the traffic of each of the data streams 1 and 2 output from the identifying unit 160 into the guaranteed traffic and the excess traffic. For example, the dividing unit 120 divides the traffic 102 into guaranteed traffic 102a of an amount equivalent to the guaranteed rate A2 and excess traffic 102b of an amount equivalent to the amount by which the guaranteed rate A2 is exceeded; and further divides the traffic 103 into guaranteed traffic 103a of an amount equivalent to the guaranteed rate A3 and excess traffic 103b of an amount equivalent to the amount by which the guaranteed rate A3 is exceeded.

The distributing unit 130 distributes the guaranteed traffic 102a and 103a obtained by the dividing unit 120, to at least any one of the aggregation links #1 and #2; and preferentially distributes the guaranteed traffic 102a and 103a over the excess traffic 102b and 103b. In this example, the distributing unit 130 distributes the guaranteed traffic 102a to the aggregation link #1 and the guaranteed traffic 103a to the aggregation link #2; and distributes the excess traffic 102b and 103b to the available bandwidth of the aggregation link #2. In FIG. 1B, the excess traffic 102b is depicted as a traffic amount that is cumulated onto the guaranteed traffic 103a and the excess traffic 103b.

A case will be described where the transmission speed of the aggregation link #1 is 50 [Mbps] and that of the aggregation link #2 is 200 [Mbps]. The distributing unit 130 distributes the guaranteed traffic 102a to the aggregation link #1 that is correlated with the data stream 1; and further distributes the guaranteed traffic 103a to the aggregation link #2 that is correlated with the data stream 2.

The distributing unit 130 calculates the available bandwidth of the aggregation link #1 by subtracting the rate of the guaranteed traffic 102a distributed to the aggregation link #1 (50 [Mbps]), from the transmission speed of the aggregation link #1 (50 [Mbps]). In this case, the available bandwidth of the aggregation link #1 is zero [Mbps].

The distributing unit 130 calculates the available bandwidth of the aggregation link #2 by subtracting the rate of the guaranteed traffic 103a distributed to the aggregation link #2 (50 [Mbps]), from the transmission speed of the aggregation link #2 (200 [Mbps]). In this case, the available bandwidth of the aggregation link #2 is 150 [Mbps].

Therefore, the bandwidth of the aggregation link #1 is fully used by the guaranteed traffic 102a of the data stream 1 alone. Therefore, the distributing unit 130 distributes the excess traffic 102b and 103b of the data streams 1 and 2 to the aggregation link #2.

The guaranteed rates A2 and A3 of the data streams 1 and 2 are respectively set in ranges that are less than or equal to the lowest transmission speeds of the aggregation links #1 and #2. For example, it is assumed that the lowest transmission speeds of the aggregation links #1 and #2 are each 50 [Mbps]. The guaranteed traffic 101a of the data stream 1 is 50 [Mbps] and is distributed to the aggregation link #1 and thus, is entirely transmitted by the aggregation link #1 because the transmission speed of the aggregation link #1 never becomes less than or equal to 50 [Mbps].

The guaranteed traffic 103a and the excess traffic 102b and 103b that are distributed to the aggregation link #2 are each transmitted by the aggregation link #2 only when the total of the excess traffic 102b and 103b is less than or equal to 150 [Mbps].

If the transmission speed of the aggregation link #2 drops to 50 [Mbps], the transferring apparatus 142 executes the bandwidth guarantee for the data stream 2 by using the entire bandwidth of the aggregation link #2 for all the traffic of the data stream 2. In this case, all the traffic (the excess traffic 102b) of the data stream 1 and the excess traffic 103b of the data stream 2 are detained by a buffer of the transferring apparatus 142, or are discarded when no space is available in the buffer.

When a sequence guarantee of the data packets is executed, for example, the transmitting apparatus 100 may give sequence numbers defined for each data stream to the input packets. In this case, a transmitting apparatus (not depicted) on the receiving side through the link aggregation, arranges the data packets in sequence based on the sequence numbers for each data stream and outputs the data packets to another apparatus that is the addressee of the data packets.

FIG. 1C is a diagram of a third example of the configuration of the transmitting apparatus according to the embodiment. In FIG. 1C, portions identical to those depicted in FIG. 1B are given the same reference numerals used in FIG. 1B and will not again be described. As depicted in FIG. 1C, the transmitting apparatus 100 may include a shaping unit 170 in addition to the configuration depicted in FIG. 1B. Peak rates P2 and P3 respectively represent the peak rates set for the data streams 1 and 2.

The storage unit 110 (a second storage unit) stores therein the peak rates P2 and P3 of the data streams 1 and 2. The shaping unit 170 acquires the peak rates P2 and P3 stored in the storage unit 110; and executes traffic shaping for the data streams 1 and 2 identified by the identifying unit 160 to shape the data streams 1 and 2 such that the transmission rate does exceed each of the peak rates P2 and P3. For example, the shaping unit 170 executes the traffic shaping by adjusting the output intervals of the data packets.

The dividing unit 120 divides the traffic of the data streams 1 and 2 for which the traffic shaping has been executed by the shaping unit 170, into the guaranteed traffic 102a and 103a and the excess traffic 102b and 103b.

It is assumed that the peak rates P2 and P3 are each 100 [Mbps] and that the traffic 102 and 103 of the data streams 1 and 2 input into the transmitting apparatus 100 respectively include bursts that exceed the peak rates P2 and P3.

After the shaping unit 170 executes the traffic shaping for the peak rates P2 and P3, the dividing unit 120 and the distributing unit 130 distribute the traffic to aggregation links #1 and #2. Thereby, the respective traffic of the data streams output from the transmitting apparatus on the receiving side are each within a range less than or equal to the corresponding peak rate even if the excess traffic 102b and 103b are respectively distributed to the aggregation links #1 and #2 at an arbitrary ratio.

The transferring apparatus 141 executes the bandwidth guarantee and control of the peak rate P2 based on the guaranteed rate A2 for the data stream 1 that is correlated with the aggregation link #1; and executes control for the data stream 2 (not correlated with the aggregation link #1), employing, as the peak rate, a rate acquired by subtracting the guaranteed rate A3 from the peak rate P3, that is, the rate in a case where all the excess traffic 103b is distributed.

The transferring apparatus 142 executes the bandwidth guarantee and control of the peak rate P3 based on the guaranteed rate A3, for the data stream 2 that is correlated with the aggregation link #2; and executes control for the data stream 1 (not correlated with the aggregation link #2), employing, as the peak rate, a rate acquired by subtracting the guaranteed rate A3 from the peak rate P3, that is, the rate in a case where all the excess traffic 102b is distributed. Thus, the bandwidth of each of the data streams can be guaranteed and the traffic amounts can be suppressed to be less than or equal to the peak rates.

FIG. 2 is a diagram of a first example of distribution of the traffic. It is assumed for FIG. 2 that the transmission speeds of the aggregation links #1 and #2 are each 100 [Mbps], that the guaranteed rates A2 and A3 of the data streams 1 and 2 are each 50 [Mbps], that the peak rates P2 and P3 of the data streams 1 and 2 are each 100 [Mbps], and that the traffic 102 and 103 of the data streams 1 and 2 are each 100 [Mbps].

In this case, when the guaranteed traffic 102a and 103a are respectively distributed to the aggregation links #1 and #2, the available bandwidths of the aggregation links #1 and #2 are each 50 [Mbps]. It is further assumed that the excess traffic 102b and 103b of the data streams 1 and 2 are respectively distributed to the aggregation links #1 and #2 at the ratios of 1:1.

For example, the distributing unit 130 distributes, to the aggregation link #1, 25 [Mbps] of the excess traffic 102b (i.e., half of the excess traffic 102b, which is 50 [Mbps]), as excess traffic 102b1; and further distributes, to the aggregation link #2, 25 [Mbps] of the excess traffic 102b (i.e., the remaining half of the excess traffic 102b), as excess traffic 102b2.

The distributing unit 130 distributes, to the aggregation link #1, 25 [Mbps] of the excess traffic 103b (i.e., half of the excess traffic 103b, which is 50 [Mbps]), as excess traffic 103b1; and further distributes, to the aggregation link #2, 25 [Mbps] of the excess traffic 103b (i.e., the remaining half of excess traffic 103b), as excess traffic 103b2.

FIG. 3 is a diagram of a second example of distribution of the traffic. FIG. 3 depicts an example of distribution of the traffic in a case where in FIG. 2, the transmission speeds of the aggregation links #1 and #2 respectively are 100 and 200 [Mbps]. In this case, when the guaranteed traffic 102a and 103a are respectively distributed to the aggregation links #1 and #2, the available bandwidths of the aggregation links #1 and #2 respectively are 50 and 150 [Mbps]. It is assumed that the excess traffic 102b and 103b of the data streams 1 and 2 are respectively distributed to the aggregation links #1 and #2 at the ratio of 1:3.

For example, the distributing unit 130 distributes, to the aggregation link #1, 12.5 [Mbps] of the excess traffic 102b (i.e., a quarter of the excess traffic 102b, which is 50 [Mbps]), as the excess traffic 102b1; and further distributes, to the aggregation link #2, 37.5 [Mbps] of the excess traffic 102b (i.e., the remaining three quarters of the excess traffic 102b), as the excess traffic 102b2.

The distributing unit 130 distributes, to the aggregation link #1, 12.5 [Mbps] of the excess traffic 103b (i.e., a quarter of the excess traffic 103b, which is 50 [Mbps]), as excess traffic 103b1; and further distributes, to the aggregation link #2, 37.5 [Mbps] of the excess traffic 103b (i.e., the remaining three quarters of the excess traffic 103b), as excess traffic 103b2.

FIG. 4 is a diagram of a third example of distribution of the traffic. FIG. 4 depicts a case where the guaranteed rate A2 of the data stream 1 is greater than the lowest transmission rate of the aggregation link #1 in FIG. 2. It is assumed that the transmission speeds of the aggregation links #1 and #2 respectively are 50 and 200 [Mbps]. For simplicity, it is assumed that the input traffic is only the data stream 1 and that the guaranteed rate A2 and the peak rate P2 respectively are 100 and 200 [Mbps].

It is also assumed that the lowest transmission speeds of the aggregation links #1 and #2 are each 50 [Mbps]. Therefore, a state is assumed where the transmission speed of the aggregation link #1 drops to the lowest transmission speed thereof. As depicted in FIG. 4, when the guaranteed rate A2 of the data stream 1 is greater than the lowest transmission rate of the aggregation link #1, the bandwidth guarantee is executed by distributing the guaranteed traffic 102a of the data stream 1 to the aggregation links #1 and #2.

For example, the distributing unit 130 distributes the guaranteed traffic 102a, which is 100 [Mbps], to the aggregation links #1 and #2, by dividing the guaranteed traffic 102a such that the aggregation links #1 and #2 each receive 50 [Mbps] of the guaranteed traffic 102a as the guaranteed traffic 102a1 and 102a2, respectively.

The distributing unit 130 distributes the excess traffic 102b according to the state of the available bandwidths of the aggregation links #1 and #2 similar to the case depicted in FIG. 2. For example, because the available bandwidth of the aggregation link #1 is zero [Mbps], the distributing unit 130 distributes the excess traffic 102b, which is 100 [Mbps], to the aggregation link #2.

It is assumed that the guaranteed rates set in the transferring apparatuses 141 and 142 are, for example, each 50 [Mbps], which is the distribution guaranteed rate of each of the transferring apparatuses 141 and 142, and that the peak rates set in the transferring apparatuses 141 and 142 are, for example, each 150 [Mbps], which is the rate for a case where the distribution guaranteed rate and all the excess traffic are distributed.

When the guaranteed rate A2 of the data stream 1 is 80 [Mbps], the guaranteed traffic 102a1 and 102a2 may each be set to be 40 [Mbps] or may respectively be set to be 50 and 30 [Mbps]. When the guaranteed rate A2 of the data stream 1 is 150 [Mbps], for example, three aggregation links may be established by adding a transferring apparatus, and the guaranteed traffic 102a may be distributed to the three aggregation links such that each receives 50 [Mbps].

FIG. 5 is a diagram of a fourth example of distribution of the traffic. FIG. 5 depicts an example of distribution of the traffic in a case where the transmission speeds of the aggregation links #1 and #2 respectively are 100 and 200 [Mbps] in the state depicted FIG. 4. In this case, the available bandwidths of the aggregation links #1 and #2 respectively are 50 and 150 [Mbps].

For example, the distributing unit 130 distributes the guaranteed traffic 102a to the aggregation links #1 and #2 as the guaranteed traffic 102a1 and 102a2 similar to the case depicted FIG. 4, and further distributes the excess traffic 102b of the data stream 1 to the aggregation links #1 and #2 respectively at the ratio of 1:3. For example, the distributing unit 130 distributes, to the aggregation link #1, 25 [Mbps] of the excess traffic 102b (i.e., a quarter of the excess traffic 102b, which is 100 [Mbps]), as the excess traffic 102b1; and further distributes, to the aggregation link #2, 75 [Mbps] of the excess traffic 102b (i.e., the remaining three quarters of the excess traffic 102b), as the excess traffic 102b2.

FIG. 6A is a diagram of a specific example of the transmitting apparatus. A transmitting apparatus 600 depicted in FIG. 6A is a specific example of the transmitting apparatus 100 depicted in FIGS. 1A to 1C. As depicted in FIG. 6A, the transmitting apparatus 600 includes a transfer processing unit 610 and a line IF unit 620. The line IF unit 620 is a communication interface that accommodates the links that are connected to the transmitting apparatus 600.

The transmitting apparatus 600 is connected to other apparatuses such as a wireless base station and a server, by one or more link(s) through the line IF unit 620; and is connected to a counterpart transmitting apparatus by n (n≥2) aggregation links #1 to #n through the line IF unit 620. In the example, the transmitting apparatus 600 is configured to include the one line IF unit 620 to accommodate the links. However, the transmitting apparatus 600 may be configured to include plural line IF units to accommodate the links.

The transfer processing unit 610 can be implemented by a computing circuit such as, for example, a digital signal processor (DSP) or a field programmable gate array (FPGA); and includes an identifying unit 611, a monitoring unit 612, a managing unit 613, a storage unit 614, a scheduler 615, a transmission processing unit 616, and a reception processing unit 617.

The identifying unit 160 depicted in FIGS. 1B and 1C can be implemented by, for example, the identifying unit 611. The identifying unit 611 identifies the data stream for each of packets received from another apparatus through the links and the line IF unit 620. The identification of the data stream can be executed based on, for example, an input link (input port), the MAC address of the addressee or the transmission source, the IP address of the addressee or the transmission source, the port number of the addressee or the transmission source, the type of the higher layer, or an identifier indicating another type of data, etc.

The dividing unit 120 and the distributing unit 130 depicted in FIGS. 1A to 1C can be implemented by, for example, the monitoring unit 612, the managing unit 613, and the scheduler 615. The monitoring unit 612 monitors the transferred traffic amount based on the size and the transmission time of each packet for each data stream identified by the identifying unit 611. The "traffic amount" is, for example, an amount of data per unit time. For example, the monitoring unit 612 monitors the traffic amount by acquiring the amount of data stored in the buffer for the traffic to be transferred.

The managing unit 613 (a speed acquiring unit) acquires the transmission speeds of the aggregation links #1 to #n. The transmission speeds of the aggregation links #1 to #n are, for example, the transmission speeds of the wireless communication sections included in the aggregation links #1 to #n. The transmission speeds of the wireless communication sections each vary consequent to variation of the wireless wave condition in each of the wireless communication sections, switching of the modulation scheme, etc. The managing unit 613 acquires the transmission speeds of the aggregation links #1 to #n from the transferring apparatuses that terminate the wireless communication sections included in the aggregation links #1 to #n.

The storage unit 110 depicted in FIGS. 1A to 1C can be implemented by, for example, the storage unit 614. The storage unit 614 stores therein parameters such as the guaranteed rates and the peak rates of the data streams, and information concerning predetermined aggregation links to which traffic corresponding to the guaranteed rates is to be distributed, etc. (see, for example, FIGS. 7A to 7C).

The scheduler 615 executes the distribution of the data packets (traffic) to the aggregation links, based on the traffic amount of the data streams monitored by the monitoring unit 612 and the transmission speeds of the aggregation links managed by the managing unit 613.

The transmission processing unit 616 gives sequence numbers to the data packets to be transmitted from the transmitting apparatus 600 for the sequence guarantee of the data packets. When no sequence guarantee is executed and no sequence number is necessary, the transmitting apparatus 600 may be configured to include no transmission processing unit 616. The reception processing unit 617 executes a process of sequentially arranging the data packets based on the sequence numbers given to the data packets received by the transmitting apparatus 600. When the sequence guarantee is not executed and the process of sequentially arranging the data packets is unnecessary, the transmitting apparatus 600 may be configured to include no reception processing unit 617.

FIG. 6B is a diagram of an example of transmitting apparatuses that mutually are counterpart apparatuses of one another. The transmitting apparatuses 600A (a first transmitting apparatus) and 600B (a second transmitting apparatus) depicted in FIG. 6B are each configured similarly to the transmitting apparatus 600 depicted in FIG. 6A. As depicted in FIG. 6B, the transmitting apparatuses 600A and 600B are connected to each other as counterpart apparatuses of one another.

The links between the transmitting apparatuses 600A and 600B include the aggregation links #1 to #n that are the wireless communication sections. Transferring apparatuses 631 to 63n are terminating apparatuses of the aggregation links #1 to #n for the transmitting apparatus 600A. Transferring apparatuses 641 to 64n are terminating apparatuses of the aggregation links #1 to #n for the transmitting apparatus 600B.

For example, data packets from another apparatus 1 connected to the transmitting apparatus 600A are input from a link 1 and are output to any one of the transferring apparatuses 631 to 63n through the line IF unit 620 and the transfer processing unit 610 of the transmitting apparatus 600A. The transferring apparatuses 631 to 63n respectively transmit the data packets output from the transmitting apparatus 600A to the transferring apparatuses 641 to 64n.

The data packets transmitted to the transferring apparatuses 641 to 64n are input into the transmitting apparatus 600B. The data packets input into the transmitting apparatus 600B are output to another apparatus 2 from the link 2 through the transfer processing unit 610 and the line IF unit 620 of the transmitting apparatus 600B. Herein, the flow of the data packets from the other apparatus 1 to the other apparatus 2 has been described. However, in the flow of data packets from the other apparatus 2 to the other apparatus 1, the data packets are similarly transmitted by the aggregation links #1 to #n.

FIG. 7A is a diagram of a first example of information stored in the storage unit. The storage unit 614 (a correspondence information storage unit) depicted in FIG. 6A stores, for example, a table 710 depicted in FIG. 7A. In the table 710, each of the data streams 1 and 2 is correlated with identification information, a guaranteed rate [Mbps], and a guaranteed traffic transfer link.

The identification information in the table 710 is information used to identify a data stream. In the first example, input ports 1 and 2 are respectively correlated with the data streams 1 and 2. The input ports 1 and 2 are each an input port of the line IF unit 620, into which a data stream from another apparatus is input. The identifying unit 611 identifies a data stream based on the input port into which the data stream is input, and the table 710. The information used to identify the data stream is not limited to the input port and may be information such as the transmission source MAC address, the addressee MAC address, the VLAN-ID, the transmission source IP address, and the addressee IP address, or any combination of such information.

The guaranteed rates in the table 710 are the guaranteed rates that are set for the data streams. The scheduler 615 acquires the guaranteed rates of the data streams 1 and 2 from the table 710. The guaranteed traffic transfer links in the table 710 are the aggregation links to which the guaranteed traffic of the data streams 1 and 2 are distributed. In the first example, the aggregation links #1 and #2 are respectively correlated with the data streams 1 and 2. Based on the table 710, the scheduler 615 distributes the guaranteed traffic 102a of the data stream 1 to the aggregation link #1 and the guaranteed traffic 103a of the data stream 2 to the aggregation link #2.

FIG. 7B is a diagram of a second example of the information stored in the storage unit. If the transmitting apparatus 600 executes the traffic shaping (see, for example, FIG. 1C), the storage unit 614 depicted in FIG. 6A may store the table 710 depicted in FIG. 7B. In the table 710 depicted in FIG. 7B, in addition to the items depicted in FIG. 7A, the peak rate [Mbps] is correlated with each of the data streams 1 and 2. The peak rates [Mbps] in the table 710 are the peak rates set in the data streams. The scheduler 615 acquires the peak rates P2 and P3 of the data streams 1 and 2 from the table 710.

FIG. 7C is a diagram of a third example of the information stored in the storage unit. If the guaranteed traffic of one data stream is divided and is distributed to plural aggregation links (see, for example, FIGS. 4 and 5), the storage unit 614 may store the table 710 depicted in FIG. 7C. In the table 710 depicted in FIG. 7C, the data stream 1 is correlated with the aggregation links #1 and #2 as the guaranteed traffic transfer links, and the distribution guaranteed rate is correlated with each of the aggregation links #1 and #2.

Based on the table 710 depicted in FIG. 7C, the scheduler 615 divides and distributes the guaranteed traffic 102a of the data stream 1 to the aggregation links #1 and #2 such that the aggregation links #1 and #2 each receive 50 [Mbps].

FIG. 8 is a flowchart of a process of receiving packets executed by the transmitting apparatus. The transmitting apparatus 600 executes, for example, the following operations each time the transmitting apparatus 600 receives, via the line IF unit 620, the packets to be transferred by link aggregation. The identifying unit 611 first identifies the data stream of the received packets (step S801).

The transmission processing unit 616 gives to the received packets, sequence numbers corresponding to the data stream identified at step S801 (step S802) and causes the series of operation steps to come an end. However, if no sequence guarantee is executed, the operation at step S802 may be omitted. The packets processed according to the flowchart depicted in FIG. 8 are stored to the buffer of the transmitting apparatus 600 and are stored according to data stream, as packets awaiting transmission.

FIG. 9 is a flowchart of a process of packet transmission executed by the transmitting apparatus. The transmitting apparatus 600 repeatedly executes, for example, the following operation steps for each of the data streams when packets awaiting transmission are stored in the buffer according to the operation steps depicted in FIG. 8. The scheduler 615 determines whether the packets awaiting transmission and stored in the buffer as guaranteed packets (guaranteed traffic) or excess packets (excess traffic) can be read out by the scheduler 615 (step S901). The determination method employed at step S901 will be described later (see, for example, FIGS. 10 and 11).

If the scheduler 615 determines at step S901 that the scheduler 615 can not read the packets awaiting transmission (step S901: NO), the scheduler 615 causes the series of operation steps to come to an end. If the scheduler 615 determines that the scheduler 615 can read the packets awaiting transmission (step S901: YES), the scheduler 615 determines whether the readable packets to be transmitted are readable as the guaranteed packets (step S902).

If the scheduler 615 determines at step S902 that the packets awaiting transmission are readable as the guaranteed packets (step S902: YES), the scheduler 615 acquires from the table 710, the guaranteed packet transfer link to be used for the data stream (step S903), transmits the readable packets to the guaranteed packet transfer link acquired at step S903 (step S904), and causes the series of operation steps to come to an end.

If the scheduler 615 determines at step S902 that the packets awaiting transmission are readable not as the guaranteed packets but as the excess packets (step S902: NO), the scheduler 615 determines the link to which the excess packets are to be distributed (step S905). The determination method at step S905 will be described later (see, for example, FIGS. 12 to 19). The scheduler 615 transmits the packets awaiting transmission to the link determined at step S905 (step S906) and causes the series of operation steps to come to an end.

FIG. 10 is a diagram of an example of a reading determination process executed by the transmitting apparatus. The transmitting apparatus 600 manages for each of the data streams 1 to m, the packets awaiting transmission and stored in the buffer. The monitoring unit 612 includes for each transmission queue 1011 to 101m of the data streams 1 to m, a token bucket counter 1020 for the guaranteed rate and a token bucket counter 1030 for the peak rate.

The scheduler 615 determines for each of the packets stored in the buffer and by using the token bucket counter 1020 for the guaranteed rate and the token bucket counter 1030 for the peak rate, whether the reading of a packet is permitted and whether the packet is a guaranteed packet or an excess packet. Guaranteed rate tokens (each in units of, for example, bits) corresponding to the size of the guaranteed rate are periodically added to the token bucket counter 1020 for the guaranteed rate. Peak rate tokens (each in units of, for example, bits) corresponding to the size of the peak rate are periodically added to the token bucket counter 1030 for the peak rate.

However, the token bucket counter 1020 for the guaranteed rate and the token bucket counter 1030 for the peak rate each have an upper limit value set therefor and the no token is added exceeding the upper limit value. The upper limit values of the token bucket counter 1020 for the guaranteed rate and the token bucket counter 1030 for the peak rate each correspond to a consecutively readable data size for a case where transmission queues are cumulated. The peak rate token is set to have a larger value than that of the guaranteed rate token.

For example, it is assumed that the guaranteed rate of the data stream 1 is 50 [Mbps]. For the data stream 1, when the cycle thereof is one [msec], only the guaranteed rate tokens corresponding to 50 [kbit] are set to be added to the token bucket counter 1020 for the guaranteed rate. The upper limit value is set to be 500 [kbit] for the token bucket counter 1020 for the guaranteed rate.

It is assumed that the peak rate of the data stream 1 is 100 [Mbps]. For the data stream 1, when the cycle thereof is one [msec], only the peak rate tokens that correspond to 100 [kbit] are set to be added to the token bucket counter 1030 for the peak rate. The upper limit value is set to be 1,000 [kbit] for the token bucket counter 1030 for the peak rate.

If the amount of the tokens in the token bucket counter 1020 for the guaranteed rate is greater than or equal to the amount of the packets awaiting transmission, the scheduler 615 reads the packets awaiting transmission as the guaranteed packets. If the amount of the tokens in the token bucket counter 1030 is greater than or equal to the amount of the packets awaiting transmission and the amount of the tokens in the token bucket counter 1020 is less than the amount of the packets awaiting transmission, the scheduler 615 reads the packets awaiting transmission as the excess packets. The scheduler 615 distributes the packets awaiting transmission and read as the guaranteed or the excess packets, to at least any one among the aggregation links #1 to #n and transmits the packets thereto through a switch 1040.

If the amount of the tokens in the token bucket counter 1030 for the peak rate is less than the amount of the packets awaiting transmission, the scheduler 615 determines that the packets awaiting transmission are not allowed to be read at the current time. In this case, the packets awaiting transmission in the buffer are detained until tokens are accumulated in each of the token bucket counters.

FIG. 11 is a flowchart of an example of the reading determination process executed by the transmitting apparatus. The transmitting apparatus 600, for example, at step S901 depicted in FIG. 9, executes operation steps depicted in FIG. 11 and thereby determines whether the packets awaiting transmission and stored in the buffer are readable as the guaranteed or the excess packets. In the reading determination process, packets may be processed one packet at a time from each data stream in a round-robin scheme, or all the packets awaiting transmission in a data stream may be processed followed by the packets awaiting transmission in the next data stream.

The scheduler 615 acquires the size (amount) of readable packets awaiting transmission (step S1101); acquires the value of the token bucket counter 1020 for the guaranteed rate for the data stream to be processed (step S1102); and determines if the counter value acquired at step S1102 is greater than or equal to the size acquired at step S1101 (step S1103).

If the scheduler 615 determines at step S1103 that the counter value is greater than or equal to the size of the packets (step S1103: YES), the scheduler 615 advances to the operation at step S1104. The scheduler 615 subtracts tokens of an amount corresponding to the packet size acquired at step S1101, from the tokens in the token bucket counters 1020 and 1030 (step S1104). The scheduler 615 determines that the packets awaiting transmission are readable as the guaranteed packets (step S1105) and causes the series of operation steps to come to an end.

If the scheduler 615 determines at step S1103 that the counter value is not greater than or equal to the packet size (step S1103: NO), the scheduler 615 acquires the counter value of the token bucket counter 1030 for the peak rate of the data stream to be processed (step S1106) and determines if the counter value acquired at step S1106 is greater than or equal to the packet size acquired at step S1101 (step S1107).

If the scheduler 615 determines at step S1107 that the counter value is greater than or equal to the packet size (step S1107: YES), the scheduler 615 advances to the operation at step S1108. The scheduler 615 subtracts tokens of an amount corresponding to the packet size acquired at step S1101, from the tokens in the token bucket counter 1030 for the peak rate (step S1108). The scheduler 615 determines that the packets awaiting transmission are readable as the excess packets (step S1109) and causes the series of operation steps to come to an end.

If the scheduler 615 determines at step S1107 that the counter value is not greater than or equal to the packet size (step S1107: NO), the scheduler 615 determines that the packets awaiting transmission are not readable (step S1110) and causes the series of operation steps to come to an end. Thus, packets corresponding to the guaranteed rate can be transmitted as the guaranteed packets and packets corresponding to an excess portion exceeding the guaranteed rate can be transmitted as the excess packets with the upper limit that is the peak rate.

A method of determining the distribution destinations of the excess packets according to fixed sequence weighted round-robin (WRR) at, for example, step S905 depicted in FIG. 9 will be described with reference to FIGS. 12 to 15.

FIG. 12 is a flowchart (Part I) of a first example of the excess packet distribution process. The scheduler 615 determines a pattern of the WRR (WRR pattern) by executing the following operation steps when an event occurs such as, for example, variation of the transmission speed of each of the aggregation links, addition or deletion of a data stream, or change of the guaranteed rate.

The scheduler 615 acquires the transmission speed of each of the aggregation links from the managing unit 613 (step S1201) and acquires the guaranteed rate and the guaranteed traffic transfer link of each of the data streams from the table 710 stored in the storage unit 614 (see FIGS. 7A to 7C) (step S1202).

The scheduler 615 calculates the available bandwidth of each of the aggregation links based on the transmission speeds acquired at step S1201 and the guaranteed rates acquired at step S1202 (step S1203), determines the WRR pattern based on the ratio of the available bandwidths of the aggregation links calculated at step S1203 (step S1204), and causes the series of operation steps to come to an end.

For example, when the aggregation links are two that are the aggregation links #1 and #2 and the ratio of the available bandwidth of the aggregation link #1 to that of the aggregation link #2 is 1:1, the scheduler 615 sets the order of the aggregation links #1 and #2 to be the WRR pattern. If the above ratio of the available bandwidths is 1:3, the scheduler 615 sets the order of the aggregation links #1, #2, #2, and #2 to be the WRR pattern. The scheduler 615 excludes aggregation links whose available bandwidths are each zero, from being distribution destinations for the excess packets.

FIG. 13 is a flowchart (Part II) of the first example of the excess packet distribution process. The scheduler 615 executes the following operation steps at, for example, step S905 depicted in FIG. 9. The scheduler 615 acquires the WRR pattern determined at step S1204 depicted in FIG. 12 and a pointer indicating the position of the current WRR (step S1301).

The scheduler 615 acquires the aggregation link indicated by the pointer in the WRR pattern acquired at step S1301 (step S1302). For example, the aggregation link #1 is acquired when the ratio of the available bandwidth of one aggregation link to that of the other is 1:1; the WRR pattern indicates the aggregation links #1 and #2; and the pointer indicates the head of the WRR pattern.

The scheduler 615 increments the pointer of the WRR for the next reading session (step S1303) and causes the series of operation steps to come to an end. When the pointer indicates the head of the WRR pattern, the position indicated by the pointer incremented at step S1303 is changed to the aggregation link #2.

Figure 14:
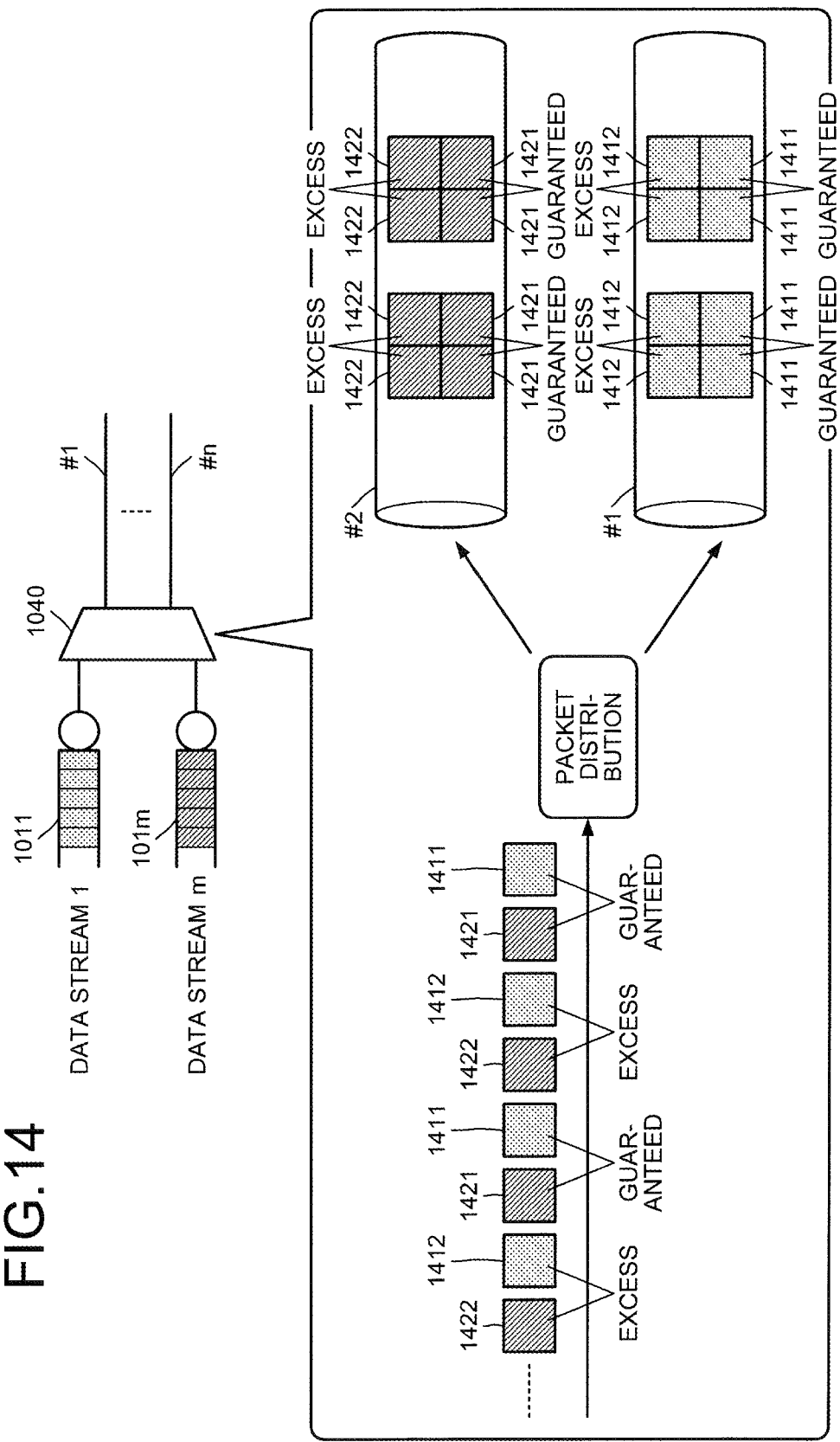
FIG. 14 is a diagram of a first example of distribution by the determination process depicted in FIGS. 12 and 13.

FIG. 14 is a diagram of a first example of distribution by the determination process depicted in FIGS. 12 and 13. For example, it is assumed that, as the result of the operation steps depicted in FIG. 12, the ratio of the available bandwidth of the aggregation link #1 to that of the aggregation link #2 is 1:1 and the WRR pattern indicates the order of the aggregation links to be #1 and #2. Guaranteed packets 1411 and 1421 respectively represent the guaranteed packets of the data streams 1 and 2. Excess packets 1412 and 1422 respectively represent the excess packets of the data streams 1 and 2.

The guaranteed packets 1411 and 1421 are respectively distributed to the aggregation links #1 and #2 that are respectively correlated with the data streams 1 and 2.

The first excess packet 1412 of the data stream 1 is distributed to the aggregation link #1. The first excess packet 1422 of the data stream 2 is distributed to the aggregation link #2. The second excess packet 1412 of the data stream 1 is distributed to the aggregation link #1. The second excess packet 1422 of the data stream 2 is distributed to the aggregation link #2.

FIG. 15 is a diagram of a second example of distribution by the determination process depicted in FIGS. 12 and 13. In FIG. 15, portions identical those depicted in FIG. 14 are given the same reference numerals used in FIG. 14 and will not again be described. For example, it is assumed that, as the result of the operation steps depicted in FIG. 12, the ratio of the available bandwidth of the aggregation link #1 to that of the aggregation link #2 is 1:3 and the WRR pattern indicates the order of the aggregation links to be #1, #2, #2, and #2.

The guaranteed packets 1411 and 1421 are respectively distributed to the aggregation links #1 and #2 that are respectively correlated with the data streams 1 and 2.

The first excess packet 1412 of the data stream 1 is distributed to the aggregation link #1. The first excess packet 1422 of the data stream 2 is distributed to the aggregation link #2. The second excess packet 1412 of the data stream 1 is distributed to the aggregation link #2. The second excess packet 1422 of the data stream 2 is distributed to the aggregation link #2.

In this manner, use of the WRR enables distribution of the excess packets according to the amount of the available bandwidth of each of the aggregation links.

A method of determining the distribution destinations of the excess packets based on sliding WRR executed at, for example, step S905 depicted in FIG. 9 will be described with reference to FIGS. 16 to 18. In the sliding WRR, the order of the WRR is not fixed for all the rounds and the starting position thereof is shifted for each round. Therefore, to manage the starting position of the WRR, in addition to the pointers of the WRR, a pointer for the round starting position is also used. The scheduler 615 determines the WRR pattern at the operation steps depicted in FIG. 12.

FIG. 16 is a flowchart of a second example of the excess packet distribution process. The scheduler 615 executes the following operation steps at, for example, step S905 depicted in FIG. 9. The scheduler 615 acquires the WRR pattern determined at step S1204 depicted in FIG. 12 and the pointer indicating the position of the current WRR (step S1601).

The scheduler 615 acquires the aggregation link indicated by the pointer in the WRR pattern acquired at step S1601 (step S1602). For example, the aggregation link #1 is acquired in a case where the ratio of the available bandwidth of one aggregation link to that of the other is 1:1 and the WRR pattern indicates the aggregation links #1 and #2 when the pointer indicates the head of the WRR pattern.

The scheduler 615 determines whether the current round has come to an end (the position has shifted through the entire round) (step S1603). If the scheduler 615 determines that the current round has not yet come to an end (step S1603: NO), the scheduler 615 increments the pointer of the WRR for the next reading session (step S1604) and causes the series of operation steps to come to an end.

If the scheduler 615 determines at step S1603 that the current round has come to an end (step S1603: YES), the scheduler 615 increments the round starting position pointer (step S1605). Thereby, the starting position of the WRR for the next round can be shifted. For example, it is assumed that the ratio of the available bandwidth of one aggregation link to that of the other aggregation link is 1:3 and the WRR pattern indicates the aggregation links #1, #2, #2, and #2.

In this case, when the round starting position pointer indicates "1", the reading order is the aggregation links #1, #2, #2, and #2; when the round starting position pointer indicates "2", the reading order is the aggregation links #2, #2, #2, and #1; when the round starting position pointer indicates "3", the reading order is the aggregation links #2, #2, #1, and #2; and, when the round starting position pointer indicates "4", the reading order is the aggregation links #2, #1, #2, and #2.

The scheduler 615 sets the pointer of the WRR for the next round to indicate the position of the round starting position pointer incremented at step S1605 (step S1606) and causes the series of operation steps to come to an end.

FIG. 17 is a diagram of a first example of the distribution by the determination process depicted in FIG. 16. In FIG. 17, portions identical those depicted in FIG. 14 are given the same reference numerals used in FIG. 14 and will not again be described. For example, it is assumed that, as the result of the operation steps depicted in FIG. 12, the ratio of the available bandwidth of the aggregation link #1 to that of the aggregation link #2 is 1:1 and the WRR pattern indicates the order of the aggregation links to be #1 and #2. The guaranteed packets 1411 and 1421 are respectively distributed to the aggregation links #1 and #2 that are respectively correlated with the data streams 1 and 2.

The first excess packet 1412 of the data stream 1 is distributed to the aggregation link #1. The first excess packet 1422 of the data stream 2 is distributed to the aggregation link #2. The second excess packet 1412 of the data stream 1 is distributed to the aggregation link #2. The second excess packet 1422 of the data stream 2 is distributed to the aggregation link #1.

FIG. 18 is a diagram of a second example of the distribution by the determination process depicted in FIG. 16. In FIG. 18, portions identical those depicted in FIG. 17 are given the same reference numerals used in FIG. 17 and will not again be described. For example, it is assumed that, as the result of the operation steps depicted in FIG. 12, the ratio of the available bandwidth of the aggregation link #1 to that of the aggregation link #2 is 1:3 and the WRR pattern indicates the order of the aggregation links to be #1, #2, #2, and #2. The guaranteed packets 1411 and 1421 are respectively distributed to the aggregation links #1 and #2 that respectively are correlated with the data streams 1 and 2.

The first excess packet 1412 of the data stream 1 is distributed to the aggregation link #1. The first excess packet 1422 of the data stream 2 is distributed to the aggregation link #2. The second excess packet 1412 of the data stream 1 is distributed to the aggregation link #2. The second excess packet 1422 of the data stream 2 is distributed to the aggregation link #2.

The third excess packet 1412 of the data stream 1 is distributed to the aggregation link #2. The third excess packet 1422 of the data stream 2 is distributed to the aggregation link #2. The fourth excess packet 1412 of the data stream 1 is distributed to the aggregation link #2. The fourth excess packet 1422 of the data stream 2 is distributed to the aggregation link #1.

FIG. 18 does not depict the fifth to the eighth excess packets 1412 and 1422 of the data streams 1 and 2 described below. The fifth excess packet 1412 of the data stream 1 is distributed to the aggregation link #2. The fifth excess packet 1422 of the data stream 2 is distributed to the aggregation link #2. The sixth excess packet 1412 of the data stream 1 is distributed to the aggregation link #1. The sixth excess packet 1422 of the data stream 2 is distributed to the aggregation link #2.

The seventh excess packet 1412 of the data stream 1 is distributed to the aggregation link #2. The seventh excess packet 1422 of the data stream 2 is distributed to the aggregation link #1. The eighth excess packet 1412 of the data stream 1 is distributed to the aggregation link #2. The eighth excess packet 1422 of the data stream 2 is distributed to the aggregation link #2.

In this manner, use of the sliding WRR enables distribution of the excess packets according to the amount of the available bandwidth of each of the aggregation links. According to the sliding WRR, the excess packets of each of the data streams do not concentrate on a specific link and can be distributed more evenly. Therefore, for example, when the transmission speed of an aggregation link drops, the effect of delay and discarding on each of the data streams is same as that on other data streams, whereby impartiality among the data streams can be improved.

A method of determining the distribution destinations of the excess packets based on the link use rate at, for example, step S905 depicted in FIG. 9 will be described with reference to FIG. 19.

FIG. 19 is a flowchart of a third example of the excess packet distribution process. The scheduler 615 executes the following operation steps at, for example, step S905 depicted in FIG. 9. The scheduler 615 acquires the transmission speed of each of the aggregation links (step S1901); and acquires the guaranteed rate for each of the data streams and the guaranteed traffic transfer link from the table 710 stored in the storage unit 614 (see FIGS. 7A to 7C) (step S1902).

The scheduler 615 acquires the amount of the excess traffic of each of the aggregation links (step S1903). For example, when the scheduler 615 determines at step S1109 of FIG. 11 that the packets awaiting transmission are read as the excess packets, the scheduler 615 stores therein the size of the packets to be read as the transmission data amount by cumulating therein the size of the packets; and can acquire the amount of excess traffic by converting the transmission data amount cumulated and stored therein into traffic amount per unit time.

The scheduler 615 calculates the use rate for the excess traffic in each of the aggregation links based on the amount of excess traffic of each of the aggregation links acquired at step S1903 (step S1904). The "use rate of the excess traffic" refers to the rate of the traffic of the excess packets occupying the available band.

For example, when the transmission data amount in one second is 10 [Mbit], the transmission traffic amount is 10 [Mbps]. For example, it is assumed for an aggregation link that the transmission speed is 100 [Mbps]; the total of the transmitted guaranteed rates is 50 [Mbps]; and the traffic amount of the excess packets is 10 [Mbps]. In this case, the use rate of the excess traffic can be calculated as "the traffic amount of the excess packets/available band= 10/(100−50)=0.2.

The scheduler 615 selects the aggregation link whose use rate for the excess traffic calculated at step S1904 is the lowest, as a link to which the excess traffic is to be distributed (step S1905) and causes the series of operation steps to come to an end.

The determination of the distribution destinations of the excess packets based on the link use rate as described above enables the distribution of the excess packets such that the rate of the traffic amount of the excess packets occupying the available bandwidth is equalized among the aggregation links even when differences in the packet size is significant. The size of the traffic amount of the excess packets distributed to each of the aggregation links is accurately proportional to the size of the available band.

As depicted in FIGS. 12 to 19, the scheduler 615 distributes the excess packets according to the size of the available bandwidth of each of the aggregation links. The method of determining the distribution destination links is not limited to the examples depicted in FIGS. 12 to 19 and any other method may be used.

FIG. 20 is a diagram of a first example of a transmission system to which the transmitting apparatus is applied. In FIG. 20, portions identical those depicted in FIG. 6B are given the same reference numerals used in FIG. 6B and will not again be described. A wireless transmission system 2000 depicted in FIG. 20 includes a wireless base station 2010, the transmitting apparatuses 600A and 600B, the transferring apparatuses 631 to 63n and 641 to 64n, and a wireless system core network 2020.

The transmitting apparatuses 600A and 600B each transfer data streams transmitted and received between the wireless base station 2010 and the wireless system core network 2020 via the link aggregation of the aggregation links #1 to #n. In this manner, the transmitting apparatuses 600A and 600B are applicable to the backhaul line portion between the wireless base station 2010 and the wireless system core network 2020 of the wireless transmission system 2000.

FIG. 21 is a diagram of a second example of the transmission system to which the transmission apparatus is applied. In FIG. 21, portions identical those depicted in FIG. 6B are given the same reference numerals used in FIG. 6B and will not again be described. A transmission system 2100 depicted in FIG. 21 includes a user base LAN 2110, the transmitting apparatuses 600A and 600B, the transferring apparatuses 631 to 63n and 641 to 64n, and a wide-area backbone 2120.

The transmitting apparatuses 600A and 600B each transfer data streams transmitted and received between the user base LAN 2110 and the wide-area backbone 2120 via the link aggregation of the aggregation links #1 to #n. In this manner, the transmitting apparatuses 600A and 600B are applicable to the VPN connection link portion between the user base LAN 2110 and the wide-area backbone 2120 of the transmission system 2100.

As described, according to the transmitting apparatus, the transmission method, and the transmission system, the traffic of an amount corresponding to the guaranteed rate of the traffic can be distributed to the wireless links preferentially, and the traffic exceeding the guaranteed rate can be distributed to the available bandwidth of each of the wireless links. Thereby, the throughput can be improved while guaranteeing bandwidth.

The transmitting apparatus, the transmission method, and the transmission system that are disclosed herein enable throughput to be enhanced while maintaining guaranteed bandwidth.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmitting apparatus that transmits a data stream via a plurality of wireless links, the transmitting apparatus comprising:

a storage unit that stores a guaranteed rate to be guaranteed for the data stream;

a dividing unit that divides traffic of the data stream into first traffic corresponding to the guaranteed rate stored in the storage unit and second traffic corresponding to a portion of the traffic exceeding the guaranteed rate;

a distributing unit that distributes the first traffic to at least any one of the wireless links preferentially over the second traffic, and distributes the second traffic to available bandwidths of the plurality of wireless links according to a ratio of available bandwidths of the plurality of wireless links after the first traffic has been distributed; and a correspondence information storage unit that stores correspondence information that correlates the data stream and a wireless link whose lowest transmission rate is greater than or equal the guaranteed rate of the plurality of wireless links; wherein the distributing unit distributes the first traffic to the wireless link that is correlated with the data stream in the correspondence information stored in the correspondence information storage unit.

2. The transmitting apparatus according to claim 1, further comprising a speed acquiring unit that acquires a transmission speed of each of the wireless links, wherein the distributing unit calculates the available bandwidth of each of the wireless links, based on the transmission speed acquired by the speed acquiring unit and distributes the second traffic based on the calculated available bandwidths.

3. The transmitting apparatus according to claim 1, further comprising a monitoring unit that monitors a traffic amount of the data stream, wherein the dividing unit divides the traffic into the first traffic and the second traffic based on the traffic amount monitored by the monitoring unit.

4. The transmitting apparatus according to claim 1, wherein the distributing unit divides the first traffic to distribute the first traffic to the wireless links, when the guaranteed rate is higher than the lowest transmission speed of the wireless link correlated with the data stream.

5. The transmitting apparatus according to claim 1, further comprising:

a second storage unit that stores a peak rate that indicates an upper limit of a transmission rate of the data stream; and a shaping unit that shapes the data stream such that the transmission rate of the data stream does not exceed the peak rate stored in the second storage unit, wherein the dividing unit divides the data stream shaped by the shaping unit.

6. The transmitting apparatus according to claim 1, further comprising a transmission processing unit that gives sequence numbers to packets of the data stream, wherein the dividing unit divides the data stream to which the sequence numbers are given by the transmission processing unit.

7. A transmitting apparatus that transmits a plurality of data streams via a plurality of wireless links, the transmitting apparatus comprising:

a storage unit that stores a guaranteed rate to be guaranteed for each of the data streams;

a dividing unit that divides traffic of each of the data streams into first traffic corresponding to the guaranteed rate stored in the storage unit and second traffic corresponding to a portion of the traffic exceeding the guaranteed rate;

a distributing unit that distributes the first traffic of each of the data streams to at least any one of the wireless links preferentially over the second traffic of each of the data streams, and distributes the second traffic of each of the data streams to available bandwidth of each of the plurality of wireless links according to a ratio of available bandwidths of the plurality of wireless links after the first traffic has been distributed; and a correspondence information storage unit that stores correspondence information that correlates the data stream and a wireless link whose lowest transmission rate is greater than or equal the guaranteed rate of the plurality of wireless links; wherein the distributing unit distributes the first traffic to the wireless link that is correlated with the data stream in the correspondence information stored in the correspondence information storage unit.

8. The transmitting apparatus according to claim 7, further comprising:

a second storage unit that stores a peak rate that indicates an upper limit of a transmission rate of each of the data streams; and a shaping unit that shapes each of the data stream such that the transmission rate of each of the data streams does not exceed the peak rate stored in the second storage unit, wherein the dividing unit divides each of the data streams shaped by the shaping unit.

9. The transmitting apparatus according to claim 7, further comprising a transmission processing unit that gives sequence numbers to packets of each of the data streams, wherein the dividing unit divides each of the data streams to which the sequence numbers are given by the transmission processing unit.

10. A transmission method executed by a transmitting apparatus that transmits a data stream via a plurality of wireless links, the transmission method comprising:

acquiring a guaranteed rate to be guaranteed for the data stream;

dividing traffic of the data stream into first traffic corresponding to the acquired guaranteed rate and second traffic corresponding to a portion of the traffic exceeding the guaranteed rate;

distributing the divided first traffic to at least any one of the wireless links preferentially over the second traffic, and distributing the second traffic to available bandwidth of the plurality of wireless links according to a ratio of available bandwidths of the plurality of wireless links after the first traffic has been distributed;

acquiring correspondence information that correlates the data stream and a wireless link whose lowest transmission rate is greater than or equal the guaranteed rate of the plurality of wireless links; and distributing the first traffic to the wireless link that is correlated with the data stream in the acquired correspondence information.

11. A transmission system that transmits a data stream via a plurality of wireless links, the transmission system comprising:

a first transmitting apparatus that acquires a guaranteed rate to be guaranteed for the data stream, divides traffic of the data stream into first traffic corresponding to the acquired guaranteed rate and second traffic corresponding to a portion of the traffic exceeding the guaranteed rate, distributes the first traffic to at least any one of the wireless links preferentially over the second traffic, distributes the second traffic to available bandwidth of the plurality of wireless links according to a ratio of available bandwidths of the plurality of wireless links after the first traffic has been distributed, acquires correspondence information that correlates the data stream and a wireless link whose lowest transmission rate is greater than or equal the guaranteed rate of the plurality wireless links, and distributes the first traffic to the wireless link that is correlated with the data stream in the acquired correspondence information; and a second transmitting apparatus that receives the data stream distributed to the plurality of wireless links and transmitted by the first transmitting apparatus.

* * * * *